United States Patent
Ezekiel et al.

(10) Patent No.: US 9,705,555 B2
(45) Date of Patent: Jul. 11, 2017

(54) DUAL OR MULTIPLE SIM STANDBY AND ACTIVE USING A SINGLE DIGITAL BASEBAND

(75) Inventors: Daniel D. Ezekiel, Ulm (DE); Srinath Ananthaswamy, Bangalore (IN); John Jelonnek, Ulm (DE)

(73) Assignee: Nokia Technologies Oy, Espoo (FI)

( * ) Notice: Subject to any disclaimer, the term of this patent is extended or adjusted under 35 U.S.C. 154(b) by 116 days.

(21) Appl. No.: 14/129,681

(22) PCT Filed: May 24, 2012

(86) PCT No.: PCT/FI2012/050497
§ 371 (c)(1),
(2), (4) Date: Feb. 20, 2014

(87) PCT Pub. No.: WO2013/007869
PCT Pub. Date: Jan. 7, 2013

(65) Prior Publication Data
US 2014/0194157 A1    Jul. 10, 2014

(30) Foreign Application Priority Data
Jul. 13, 2011 (IN) .......................... 2402/CHE/2011

(51) Int. Cl.
*H04B 1/401* (2015.01)
*H04W 76/02* (2009.01)
(Continued)

(52) U.S. Cl.
CPC .......... *H04B 1/401* (2013.01); *H04W 76/025* (2013.01); *H04W 88/06* (2013.01); *H04W 8/18* (2013.01); *H04W 72/1215* (2013.01)

(58) Field of Classification Search
CPC .. H04B 1/401; H04W 88/06; H04W 72/1215; H04W 76/025; H04W 8/18
See application file for complete search history.

(56) References Cited

U.S. PATENT DOCUMENTS 6,507,573 B1 * 1/2003 Brandt ..................... H04B 3/54
                                                340/12.33
7,415,247 B1 * 8/2008 Vaisanen .............. H04B 1/0057
                                                455/234.1
(Continued)

OTHER PUBLICATIONS

International Search Report received for corresponding Patent Cooperation Treaty Application No. PCT/FI2012/050497, dated Oct. 1, 2012, 6 pages.

*Primary Examiner* — Dinh P Nguyen
(74) *Attorney, Agent, or Firm* — Mintz Levin Cohn Ferris Glovsky and Popeo, P.C.

(57) ABSTRACT

An apparatus comprises two or more SIM card connectors in a communication system configured to operate according to a plurality of communication protocols and coupled to at least one processor (610) for processing communication signals, a control unit (632) configured to generate a control signal to select a communication path (629-1, 629-2, 631-1, 631-2, 645-1, 647-1, 647-2) dedicated to an associated SIM card connector, and a switch (630) responsive to the control signal to switch the communication signals received from or transmitted to any one of the two or more SIM card connectors using the selected communication path. An apparatus comprises a plurality of radio frequency integrated circuit RFICs (640-1, 640-2) coupled to a plurality of RF interfaces of a digital baseband (600) of a communication apparatus, the plurality of RFICs includes a programmable state machine that executes programmed instructions to perform write to the RFICs, thereby enabling RF control.

21 Claims, 17 Drawing Sheets

(51) Int. Cl.
*H04W 88/06* (2009.01)
*H04W 8/18* (2009.01)
*H04W 72/12* (2009.01)

(56) References Cited

U.S. PATENT DOCUMENTS

| | | | |
|---|---|---|---|
| 2002/0141441 A1* | 10/2002 | Neumann | H04W 88/06 370/465 |
| 2004/0176059 A1* | 9/2004 | Hayem | H04B 1/406 455/168.1 |
| 2005/0219251 A1* | 10/2005 | Chun | G06F 9/30181 345/503 |
| 2007/0067164 A1* | 3/2007 | Goudar | G10L 19/107 704/219 |
| 2008/0051332 A1 | 2/2008 | Templin | |
| 2009/0131054 A1 | 5/2009 | Zhang | |
| 2009/0186651 A1 | 7/2009 | You | |
| 2010/0009716 A1 | 1/2010 | Lee et al. | |
| 2010/0105433 A1 | 4/2010 | Lin et al. | |
| 2011/0249770 A1* | 10/2011 | Bellaouar | H03F 1/0261 375/296 |

* cited by examiner

DUAL OR MULTIPLE SIM STANDBY AND ACTIVE USING A SINGLE DIGITAL BASEBAND

RELATED APPLICATION

This application was originally filed as PCT Application No. PCT/FI2012/050497 filed May 24, 2012 which claims priority benefit from Indian Application No. 2402/CHE/2011 filed Jul. 13, 2011.

TECHNICAL FIELD

The present application relates generally to a dual standby and dual active mode mobile terminal and to a multiple SIM mobile terminal. More particularly, the present invention relates to a dual standby and dual active mode or a multiple SIM mobile apparatus using a dual smart cards or multiple SIM cards, and a method thereof for operating mobile terminal using a dual SIM cards or multiple SIM cards.

BACKGROUND

Traditionally, a dual SIM mobile phone is one which holds two SIM cards. Initially, dual-SIM adapters were made available to use in regular mobile phones to allow them to contain two SIMs, and to switch from one to the other as required. This combination is called a standby dual-SIM phone.

More recently, some phones have been devised and manufactured to natively work with two separate SIMs, both of which may be active one at a time or at the same time. These are active dual-SIM phones.

Dual-SIM operation allows the use of two different services without the need to carry two phones at the same time. For example, the same mobile phone can be used for business and private purpose with separate numbers and bills. And, in some cases of travel overseas, an additional/different SIM card may be required for the country(ies) or regions visited. Moreover, using multiple SIM cards allows the user to take advantages of the different pricing plans for calls and text messages to certain destinations as well as mobile data usage.

Until recently, the mobile phones have been largely eschewed by larger phone manufacturers due to their close ties with the mobile phone networks who would prefer that customers use only one dedicated network exclusively for technical or financial reasons. However, more recently manufacturers such as Nokia and other competitors have started producing these mobile phones, which will target customers mostly from developing countries.

Several types of adapters are available when the mobile phone is using different SIM cards. When they only allow one SIM to be active, and to receive calls, at any given time; they provide various ways of switching from one SIM to the other. Earlier versions required the phone to be switched off and on again to change from one to another. Later models allow the user to switch SIM cards via a menu or by keying in a numeric code, without switching the phone on and off.

SUMMARY

Various aspects of examples of the invention are set out in the claims.

According to a first aspect of the present invention, an apparatus comprises: two or more SIM card connectors configured to operated according to a plurality of communication protocols and coupled to:
at least one processor for processing communication signals;
a control unit configured to generate a control signal to select a communication path dedicated to an associated SIM card connector; and
a switch responsive to the control signal to switch the communication signals received from or transmitted to any one of the two or more SIM card connectors using the selected communication path.

According to a second aspect of the present invention, a method of operating two or more SIM card connectors in a communication system comprises:
detecting a state of each of two or more SIM card connectors and its associated communication protocol;
processing communication signals received and/or to be transmitted;
generating a control signal to select a communication path dedicated to an associated SIM card connector; and
switching the communication signals received or transmitted to any of the two or more SIM card connectors using the selected communication path.

According to a third aspect, an apparatus comprising a plurality of radio frequency integrated circuit RFICs coupled to a plurality of RF interfaces of a digital baseband of a communication apparatus, wherein each of the plurality of RFICs includes a programmable state machine that executes programmed instructions, wherein the programmed instructions perform write to the RFICs, thereby enabling RF control.

According to a fourth aspect of the present invention, an apparatus, comprises:
at least one processor; and
at least one memory including computer program code;
wherein the at least one memory and the computer program code are configured to, with the at least one processor, cause the apparatus to perform at least the following:
detecting a state of each of two or more SIM card connectors and its associated communication protocol;
processing communication signals received and/or to be transmitted;
generating a control signal to select a communication path dedicated to an associated SIM card connector; and
switching the communication signals received or transmitted to any of the two or more SIM card connectors using the selected communication path.

According to a fifth aspect, a computer program comprises:
code for detecting a state of each of two or more SIM card connectors and its associated communication protocol;
code for processing communication signals received and/or to be transmitted;
code for generating a control signal to select a communication path dedicated to an associated SIM card connector; and
code for switching the communication signals received or transmitted to any of the two or more SIM card connectors using the selected communication path.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1A:
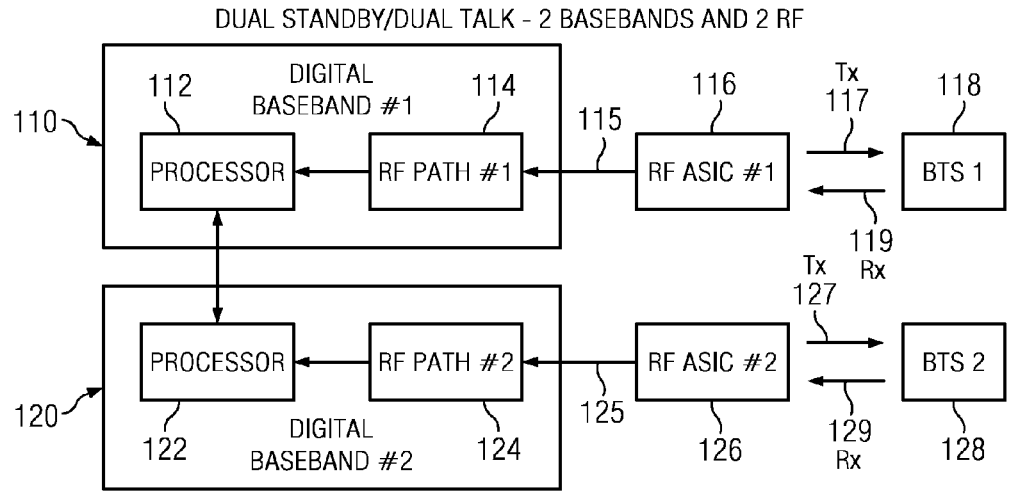
FIG. 1A shows an overview of a Dual standby-Dual active SIM card connectors implementation with two basebands and two RF-BB Connection paths.

An example embodiment of the present invention and its potential advantages are understood by referring to FIGS. 1 through 8I of the drawings.

Because of the tiny sizes of the mobile phones or electronic devices which receive the multiples SIM cards, adapters require the SIM cards to be cut to fit onto special holders in order to be inserted into the phones' SIM sockets or the electronic devices' SIM interfaces. The insertion process might present a risk of damaging the SIM cards as well as the sockets.

Regular mobile phones or electronic devices are devised and engineered with special holders which can receive one SIM card. Small adjustments are used for the special holders of two SIM cards or some time three SIM cards. For higher numbers of SIM cards, the sizes of the mobiles phones or the electronic devices have to be adjusted accordingly and the following description of the exemplary embodiments can also be adjusted to fit with three or more SIM cards.

Some adapters don't require cutting or modifying the SIM cards. Some adapters have two or more slots for the SIM cards, and sometimes a small ribbon cable which is hooked to a PCB that mimics another SIM card. Because of the added circuitry, adapters for some phones, such as those used for older models manufactured by Nokia, often include thicker battery covers. Recent variations of this setup do away with the added bulk and have more miniaturized components, allowing owners of newer handsets to go to a dual SIM setup or a higher number of SIM cards setup.

Mobile phones with built-in simultaneous dual SIM capability allow both SIMs to be active simultaneously and allow calls to be received on either number at any given time. In the case of dual SIM capability, such mobile phones have two transceivers built in, one of which may support 2G, 3G r 4G while another may only support 2G or 3G or 4G and vice versa.

For mobile phones with more than 2 SIM cards, several calls may be received on any number at any given time. In the same way, the communications systems that are supported may be a combination of 2G, 3G or 4G. In some cases, the number of transceivers is identical to the number of SIM cards. In other cases, the number of transceivers is lower than the number of SIM cards in order to reduce the sizes of the mobile phones or the electronic devices.

Another embodiment of a Dual SIM Phone, called "Dual SIM Dual Standby" (DSDS) provides the ability of having two active SIM simultaneously and using only one transceiver. The Dual SIM concept enables a phone to have two SIM Cards active at the same time and to provide several levels of services in Idle/Standby mode at the same time. However, a description of a Dual SIM phone with two levels of services category are described as an exemplary embodiment.

In Dual standby/single talk embodiment: This is a simple feature used with a dual-SIM card implementation. In "Idle/Standby" mode, both SIM cards are attached to different or the same network and are receiving pages. In "Active" mode, when either one of the SIMs is in CS (Circuit Switched, Voice only currently) or PS calls (Packet Switched: GPRS or EGPRS or WCDMA Data or HSPA data), the other SIM card drops from its network. It will not receive pages, and the user is considered unreachable. Significant impact to applications using background (packet service) connectivity needs to be considered also. The technical implementation of this embodiment is such that one Engine viz., one Baseband, one RF, and one Antenna are used. The embodiment and operations are similar in case of Dual SIM Dual STANDBY default embodiment.

FIG. 1A shows an electronic device with a Dual standby/dual talk embodiment. This FIG. 1A features a dual-SIM card implementation and two basebands. In "Idle/Standby" mode, both SIM cards are attached to different or the same network and are receiving pages from either network. In "Active" mode (Circuit or Packet switched connected) on one of the networks, it can be paged from the other network as well and can also have simultaneous phone calls (either in Circuit Switched or Packet Switched) with both SIM cards. The technical implementation of this embodiment is such that two basebands, two RFs and two Antennae are used. FIG. 1A also illustrates the case of a Dual Standby and Dual Active which is implemented with two basebands.

FIG. 1A shows a mobile terminal which comprises two digital basebands 110, 120 which are respectively coupled to two Radio Frequency units 116, 126 using ASIC. Both RF units 116, 126 may be tuned to different frequency bands of such as for example GSM and WCDMA systems. And both RF units are provided with RF transmitters and receivers for converting up and down and for amplifying received and transmitted communication signals. The communication signals are received and transmitted 117, 119, 127, 129 through a communication system using different standards such as GSM, or WCDMA respectively through Base Transceiver Stations (BTS) 118, 128.

The digital basebands 110, 120 respectively comprise two separate processors 112 and 122 to control two different paths for the received and transmitted signals 117, 119, 127, 129. A first RF path 114 is dedicated for signals to be processed by the first processor 112 whereas a second RF path 124 is dedicated for signals to be processed by the second processor 122.

Figure 1B:
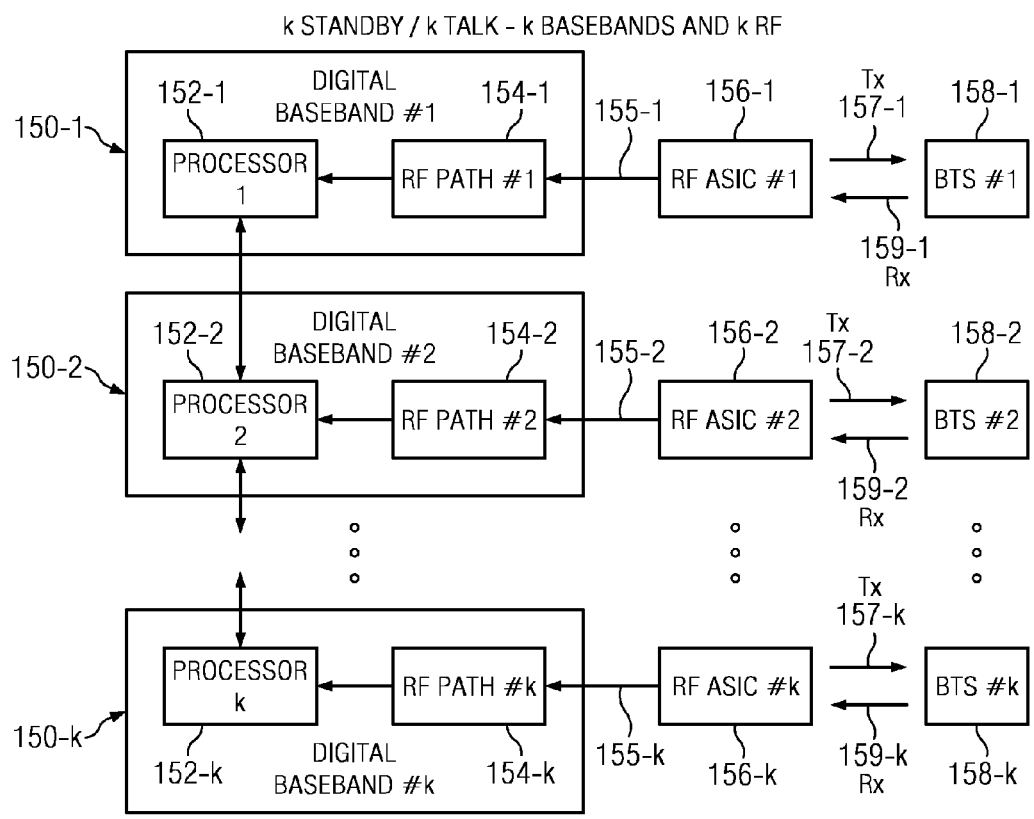
FIG. 1B shows an overview of a set of k standby-k active SIM card connectors implementation with k basebands and k RF-BB Connection paths.

FIG. 1B shows an electronic device with a k standby/k talk embodiment. This FIG. 1B features a number k of SIM cards in a mobile terminal. This k-SIM card system is implemented with k digital basebands respectively referred as 150-1, 150-2, 150-3, . . . , 150-k. Each digital baseband 150-i comprises a processor 152-i and is respectively coupled 155-i to a RF unit 156-i using ASIC through an associated RF Path #k 154-i. All RF units 156-1 to 156-k may be tuned to different or similar frequency bands such as GSM, CDMA, and WCDMA etc. Each RF unit is provided with an RF transmitter 157-i and an RF receiver 159-i for processing communication signals based either on GSM, CDMA, and WCDMA etc. frequency bands respectively through Base Transceiver Stations (BTS) 158-i.

In another exemplary embodiment, instead of having two SIM cards, a plurality of SIM cards with a corresponding number of RF paths can be implemented and used in standby and active mode. In a particular implementation of three SIM cards, three different frequency bands such as GSM, CDMA and WCDMA/HSPA frequency bands can be associated to three different RF paths in three different digital basebands. Three antennae may be used to receive and transmit communication signals from the communication system.

Figure 2A:
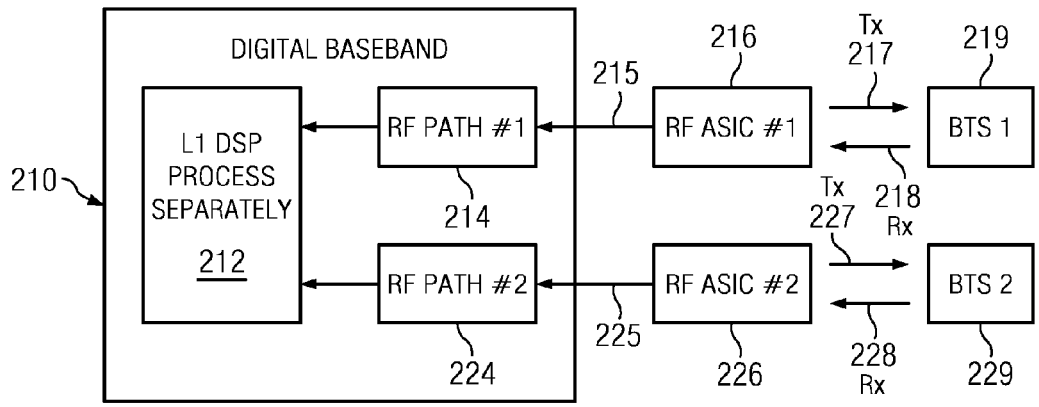
FIG. 2A shows an overview of a Dual standby-Dual active SIM card connectors implementation with one single baseband and two RF-BB Connection paths.

FIG. 2A shows a Dual Standby-Dual Active embodiment with one single digital baseband. In an exemplary specific implementation, a RX Diversity receiver path can be reused to as an additional separate Receiver Path (RF2). The present invention is extended to cover the case, wherein the $2^{nd}$ RF Path is a reuse of Rx Diversity path (rather than addition of a new RF2 Path).

Figure 5A:
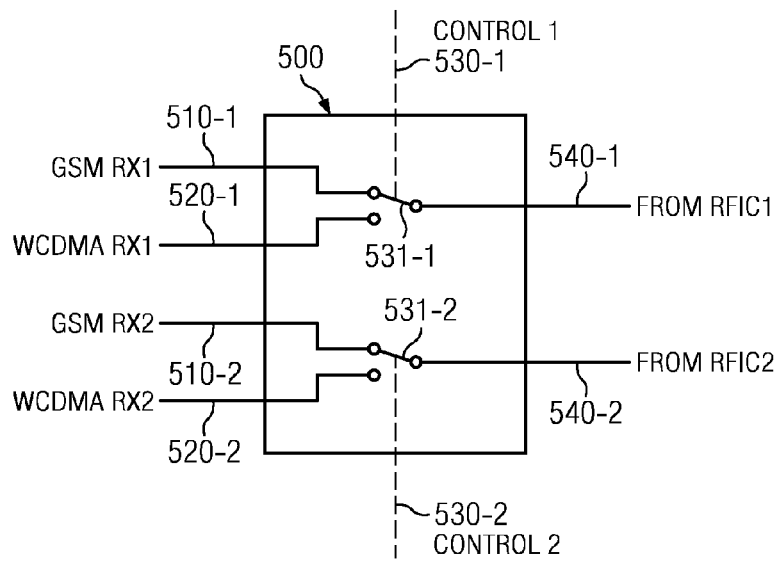
FIG. 5A shows an IQ switch having two switches controlled by two independent control interfaces.
Figure 6A:
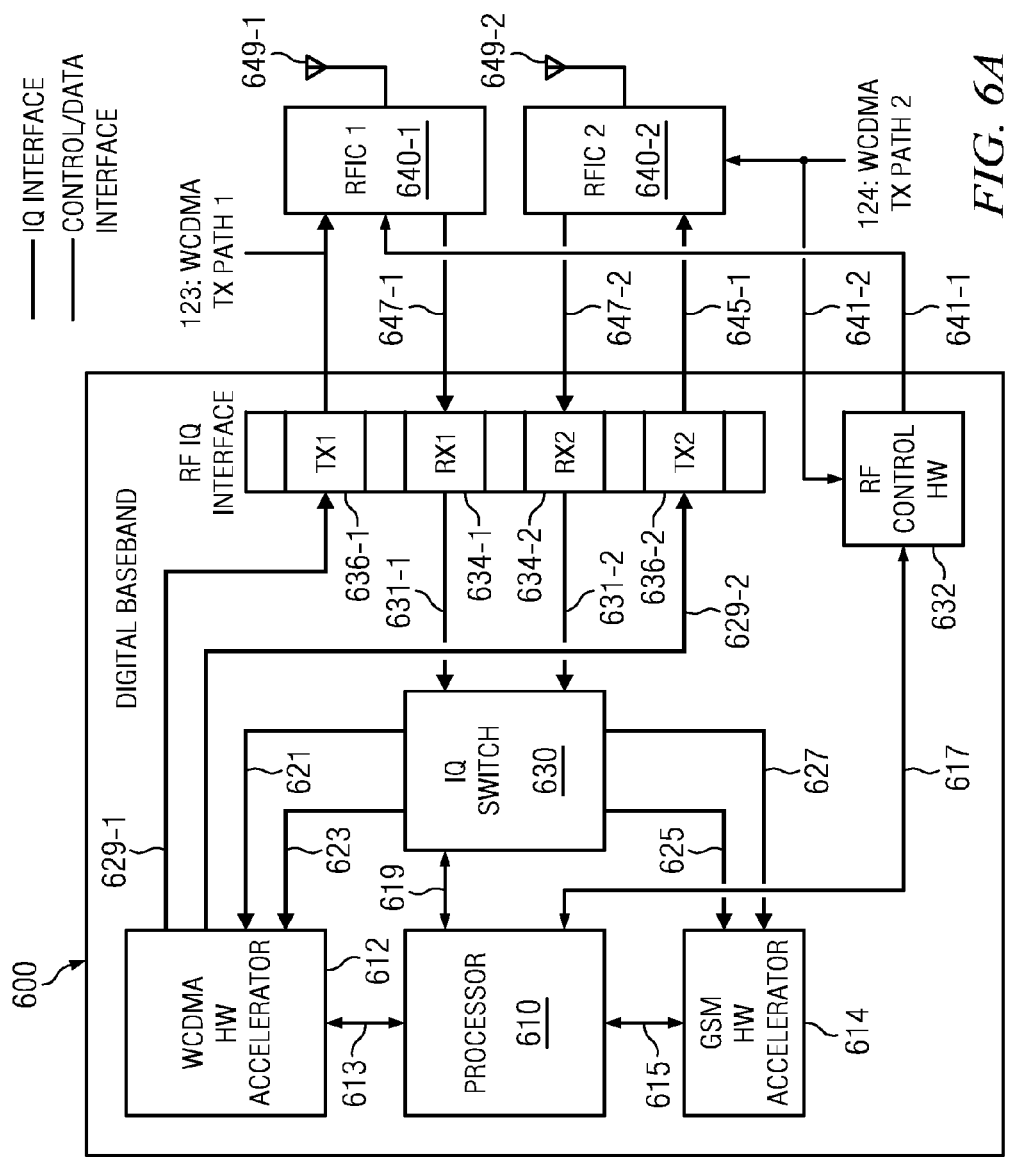
FIG. 6A shows in detail a baseband with two WCDMA RX and TX paths.

There is a desire of the present invention to reuse a Nokia Chipset that has one WCDMA/HSPA Rx Receiver, one GSM Rx Receiver. Any other chipset with one single digital baseband 210 can replace the Nokia Chipset. The Rx Diversity Receiver Path is planned to be used as the $2^{nd}$ RF Path 224 in addition to a $1^{st}$ RF Path 214. This leads to a situation wherein one GSM and one WCDMA/HSPA or another GSM connection can be simultaneously supported which is referred as Dual Active mode. This idea is now generalized to the case, wherein the $2^{nd}$ RF path 224 is added for the Receiver in the same single chipset 212 or digital baseband 210. The single chipset/processor 212 processes separately the communication signals received from and transmitted to a $1^{st}$ RF ASIC 216 and from a $2^{nd}$ RF ASIC 226 respectively on the $1^{st}$ RF path 214 with a first connection 214 and on the $2^{nd}$ RF path 224 with a second connection. As shown in FIG. 2A, the $1^{st}$ and $2^{nd}$ RF ASICs 216, 226 are respectively interfacing Base Transceiver Station (BTS) 219, 229 and the single digital baseband 210. An RF ASIC is assumed to perform the ADC functionality which is the case for most modern RF ASICs. Each of the two RF ASICs 216, 226 respectively enables the reception 218, 228 and transmission 217, 227 of the communication signals from/to the two BTS 219, 229. If either one of the RF ASICs 216, 226 is used without generalization, then the following limitations need to be considered:

To achieve full GSM+WCDMA functionality, minor ASIC upgrade is required (See FIGS. 5A and 6A which illustrate exemplary embodiment for the current implementation and the ASIC changes which are required).

There are several advantages for implementing a plurality of SIM connectors on a single digital baseband. The cost, size, Productization benefits from this technique are quite significant as mentioned below:

Provides a Low Cost—Class 4 or higher User experience (it is possible to have a viz. Voice GSM call on SIM 1 or GPRS data call on SIM 1 while having in parallel a 3G Voice or Data call OR a HSPA data transfer on SIM 2; In the same way, it is possible to have a viz, Voice GSM call on SIM 1, a GPRS data call on SIM 2, a 3G Voice or Data call on SIM 3 while having in parallel a HSPA data transfer on SIM 4;

Reduces the use of a plurality of Basebands or two Basebands to one single

Baseband ASIC and improves the cost significantly;

Improves the battery life lowered current consumption due to the usage of a single baseband; and Improves the thermal, emissions & immunity and placement issues in the final product of the mobile phone or electronic devices, since the thermal heat is created by all parts that are consuming electrical energy. As the running baseband processor is one of the major contributors for heating up the phone towards a certain acceptable user limit, the use of a single baseband will help the heating remain the user limit. Therefore, removing one or several basebands from the plurality of basebands from the mobile phone or the electrical device in order to keep one single baseband will remove unwanted heating element inside the mobile phone or electrical device. Furthermore, since the RF emissions are created by the baseband clock and all the switching elements in the baseband, specific shielding is required to prevent unwanted interferences between the different basebands and the RF parts, should there be a plurality of basebands and RF parts. Removing one or several basebands from the plurality of basebands will also eliminate source of unwanted emissions. Thus, it will not be necessary to take certain immunity of the removed basebands into account.

Figure 2B:
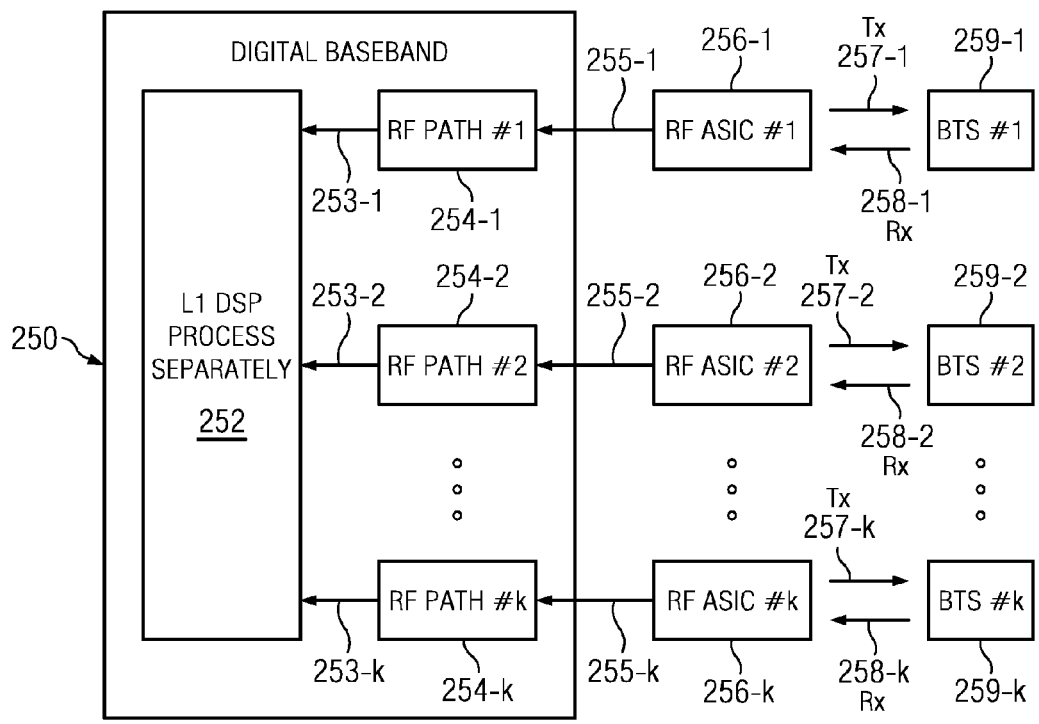
FIG. 2B shows an overview of a set of k standby-k active SIM card connectors implementation with one single baseband and k two RF-BB Connection paths.

Some software implementations need to be enhanced in order to achieve the coordinated reception and transmission of the communication signals between the plurality of SIM connectors, and more specifically the coordinated reception and transmission in the different RF paths 254-1, 254-2, . . . , 254-k between RF ASICs 256-1, 256-2, . . . , 256-k and the single baseband processor 252 in the single baseband 250 as shown in FIG. 2B.

FIG. 2B illustrates k different RF paths 254-1, 254-2, . . . , 254-k for a single digital baseband 250 implemented in an operation mode where the communications system has k Standby/k Talk with k RF ASICs 256-1, 256-2, . . . , 256-k through the different k RF path, 254-1, . . . , 254-k that enable the connections 253-1 to 253-k with a single baseband processor 252. The single baseband processor 252 processes separately the communication signals received from and transmitted to each of the plurality of RF ASICs. The k RF ASICs are interfacing Base Transceiver Stations BTS 259-1, 259-2, . . . , 259-k and the single digital baseband 250 through connections 255-1 to 255-k. Each of the k RF ASICs 256-1, 256-2, . . . , 256-k respectively enables the reception 258-1, 258-2, . . . , 258-k and transmission 257-1, 257-2, . . . , 257-k of the communication signals to/from the k BTS 259-1, 259-2, . . . , 259-k.

With a single digital baseband, the MIPs requirement on the CPU will be higher and this will mean that the CPU of the mobile phone or electronic device has to run at a higher clock frequency.

Besides, the memory requirement from the code will also be higher due to the simultaneous usage of the multiple systems being active. In the case of k RF paths on one single digital baseband, the switching between these multiple k RF paths will imply that the memory requirement be significant.

Figure 3A:
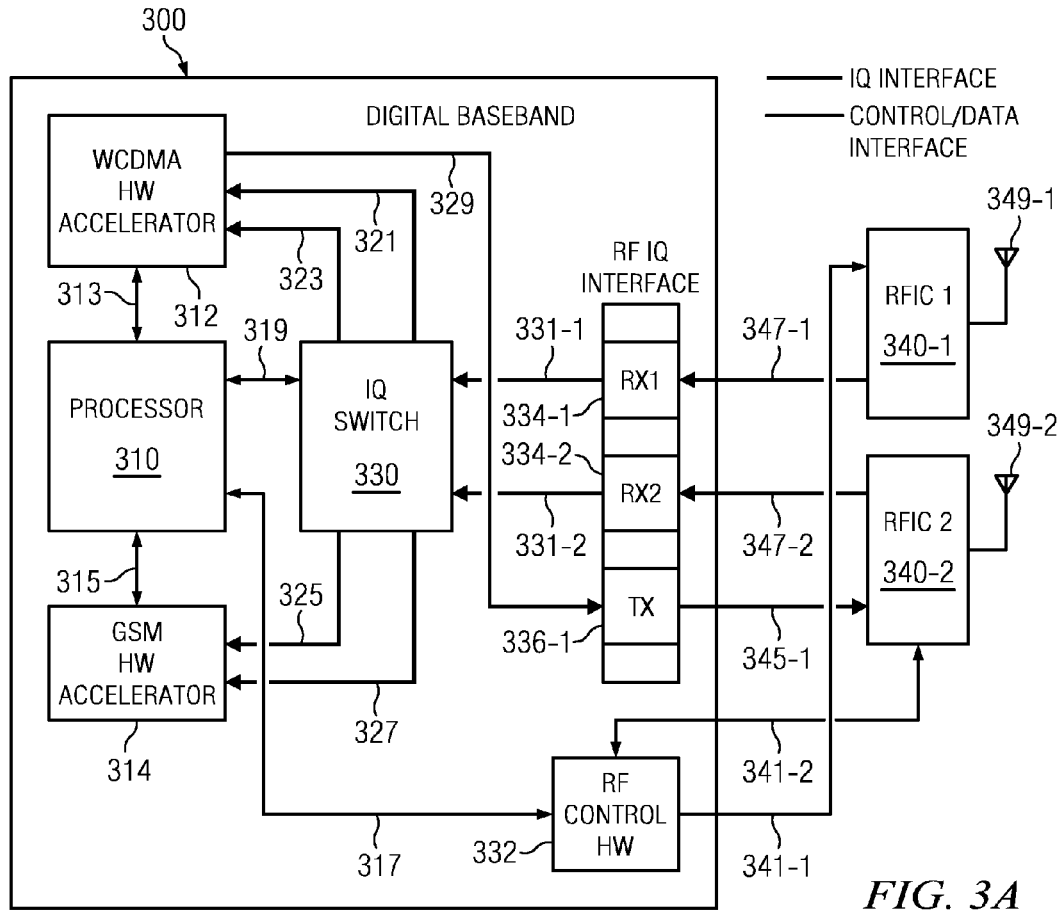
FIG. 3A shows in detail a Dual standby-Dual active SIM card connectors implementation with one single baseband and two paths. (for controlling 2 two RF-BB Connection paths)

FIG. 3A illustrates in detail an exemplary embodiment of a Dual Standby-Dual Active SIM cards implementation using one single baseband and two separate RF paths. In this particular case, the SIM card connectors support the WCDMA and the GSM communication protocols.

A single Digital Baseband 300 includes an integrated circuit that handles the processing of digital IQ samples generated by an IQ switch 330.

The IQ interface data buses are in bold lines whereas the control/data interface control lines are in thin lines.

The integrated circuit included in the single Digital Baseband 300 may contain a MCU, a RAM memory, a DSP 310, HW IP blocks (not shown in the figure) which may be used for the GSM and WCDMA signal processing. It may also contain additional components such as viz, GSM HW Accelerator 314 and WCDMA HW Accelerator 312, RF Control HW 332 etc. which are described later on. Different communication standards such as HSPA or CDMA may also be used. Furthermore, the integrated circuit may also contain an ADC/DAC, Interfaces to other peripherals such as viz., SP1, I2C, Dig RF etc.

It should be kept in mind that although the different embodiments of the present invention refer to HW circuits as examples in the corresponding figures, these HW circuits can be replaced by SW that can run instructions to operate in the same manner.

An RF IQ Interface includes a series of receiver interfaces 334-1, 334-2 and transmitter interfaces 336-1. As an example, a Nokia proprietary interface is used for transferring digital IQ samples to and from two RFICs 340-1, 340-2 to the single digital baseband 300. The two RFICs 340-1, 340-2 are respectively coupled to two different antennas 349-1, 349-2. In the current case, the Analog to Digital conversion may be performed in the RFICs 340-1, 340-2. However, it should also be kept in mind that in another embodiment, the RFICs may transfer the analog samples and the Analog to Digital conversion may be performed directly in the digital baseband as a $1^{st}$ step before passing the IQ samples to the receiver interfaces RX1 334-1 or RX2 334-2 as shown in FIG. 3A. The receiver interfaces RX1 334-1 and RX2 334-2 are respectively coupled to the RFIC 1 and 2 by data buses 347-1 and 347-2 and to the IQ switch 330 by data buses 331-1 and 331-2. Conversely, the IQ switch 330 is coupled to the WCDMA HW Accelerator 312 by data buses 321 and 323; and to the GSM HW Accelerator 314 by the data buses 325 and 327. The transmitter interface 336-1 is coupled to the RFIC 2 by a data bus 345-1 and to the WCDMA HW Accelerator 312 by a data bus 329.

The processor 310 is coupled to the WCDMA HW Accelerator 312 with a control line 313; to the GSM HW Accelerator 314 with a control line 315; to the RF Control HW 332 with a control line 317; and to the IQ Switch 330 with a control line 319. Conversely, the RF Control HW 332 is coupled respectively to the RFIC 1 and 2 with a control line 341-1 and 342-2.

The IQ Switch 330 is part of the components or modules within the Digital Baseband 300 that allows the switching of the received IQ samples to the GSM receiver chain or WCDMA receiver chain based on the control of the processor 310. The current implementation of this IQ switch 330 in the Digital Baseband 300 is such that it is unable to switch one receive path to the WCDMA side and the other to the GSM side. Because of this, an ASIC upgrade would be used to support all the GSM+WCDMA use cases listed below. The ASIC upgrade implies the introduction of a switch that is able to separately and respectively switch inputs RX1 334-1 or RX2 334-2 to WCDMA accelerator 312 or GSM HW accelerator 314.

It should be kept in mind that the GSM+GSM cases as listed can be supported in the non-modified ASIC (in its current form) and that a GSM+WCDMA simultaneous calls (Circuit or Packet switched) can be supported with the ASIC upgrade with the introduction of a Switch.

Figure 3B:
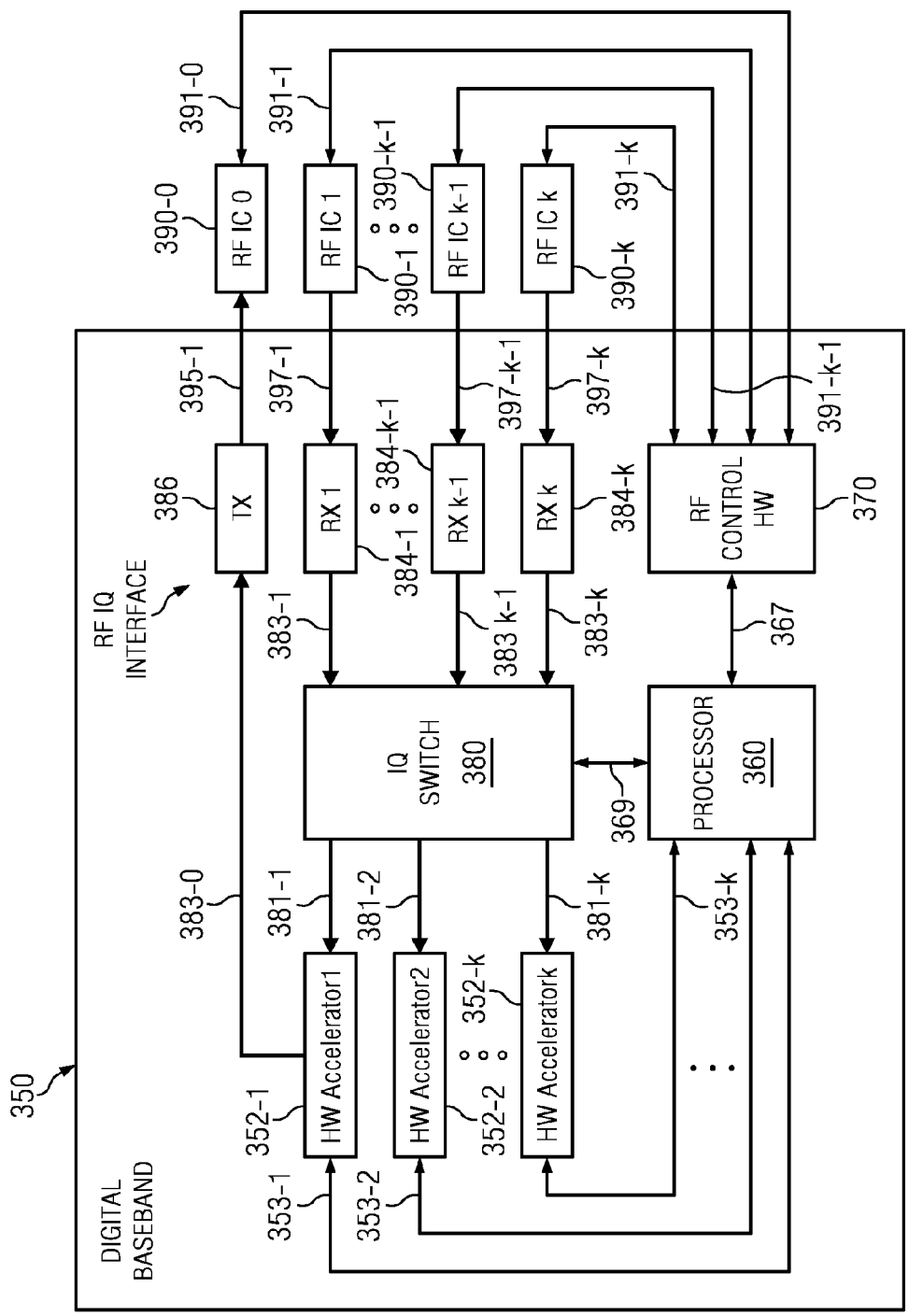
FIG. 3B shows in detail a set of k standby-k active SIM card connectors implementation with one single baseband and k paths. (for controlling k two RF-BB Connection paths)

FIG. 3B illustrates in detail an exemplary embodiment of a set of k Standby-k Active SIM cards implementation using one single baseband and k RF paths. In this particular case, the SIM card connectors can for instance support for instance the CDMA, WCDMA, HSPA and the GSM communication protocols.

In this configuration, a single Digital Baseband 350 includes an integrated circuit that handles the processing of digital IQ samples generated by an IQ switch 380.

The IQ interface data buses are in bold lines whereas the control/data interface control lines are in thin lines, just in FIG. 3A.

The integrated circuit included in the single Digital Baseband 350 may contain a MCU, a RAM memory, a DSP 360, HW IP blocks (not shown in the figure) which may be used for the different GSM, CDMA, . . . , and WCDMA signal processing. It may also contain additional corresponding components such as HW Accelerators 352-1, 352-2, . . . , 352-k which are associated to the type of communication protocols used for the signal processing. These HW Accelerators may be for instance a GSM HW Accelerator, a CDMA HW Accelerator, or a WCDMA HW Accelerator etc. An RF Control HW 370 is also coupled to the processor 360 in order to control the different RF paths. Furthermore, the integrated circuit may also contain an ADC/DAC, Interfaces to other peripherals such as viz., SP1, I2C, Dig RF etc.

An RF IQ Interface which includes a series of receiver interfaces 384-1, 384-2, . . . , 384-k and a series of transmitter interfaces 386-1 is also implemented in the single Digital Baseband 350. In this specific embodiment, the series of transmitter interfaces may include either one single transmitter interface or a plurality of transmitter interfaces. In another embodiment, a Nokia proprietary interface may also be used for transferring digital IQ samples to and from the k+1 RFICs 390-0, 390-1, . . . , 390-k to the single digital baseband 350. An Analog to Digital conversion may be performed in the k+1 RFICs 390-0, 390-1, . . . , 390-k. However, it should also be kept in mind that in another embodiment, the k+1 RFICs may transfer the analog samples, and in such case, the Analog to Digital conversion may be performed directly in the digital baseband as a $1^{st}$ step before passing the IQ samples to the receiver interfaces RX1 384-1, . . . , or RX2 384-k as shown in FIG. 3B. The transmitter interface TX 386 is connected to the HW Accelerator1 352-1 with a data bus 383-0.

The IQ Switch 380 is part of the components or modules within the Digital Baseband 350 that allows the switching of the received IQ samples to the receiver equipped with the corresponding communication protocols. For instance, there can be a GSM receiver chain, a CDMA receiver chain or a WCDMA receiver chain based on the control of the processor 360. The current implementation of this IQ switch 380 in the Digital Baseband 350 is such that it will switch one receive path to the associated side and not to the side. An ASIC upgrade enables the introduction of an IQ switch that is able to separately and respectively switch inputs RX1 384-1, RX2 384-2 or RXk 384-k to the associated accelerator 352-1, . . . , 352-k using data buses 383-1, . . . 383-k and 381-1, . . . , 381-k.

The processor 360 is respectively connected to the different k HW Accelerators 352-1, . . . , 352-k by control lines 353-1, . . . , 353-k. Processor 360 is also connected to the IQ Switch 380 by a control line 369 and to the RF Control HW 370 by a control line 367. Conversely, the RF Control HW 370 is connected to the different k+1 RFICs by control lines 391-0, . . . , 391-k. The different RFICs are connected either for transmission or reception to the RF IQ interface with data buses 395-1, 397-1, . . . , 397-k.

Figure 4:
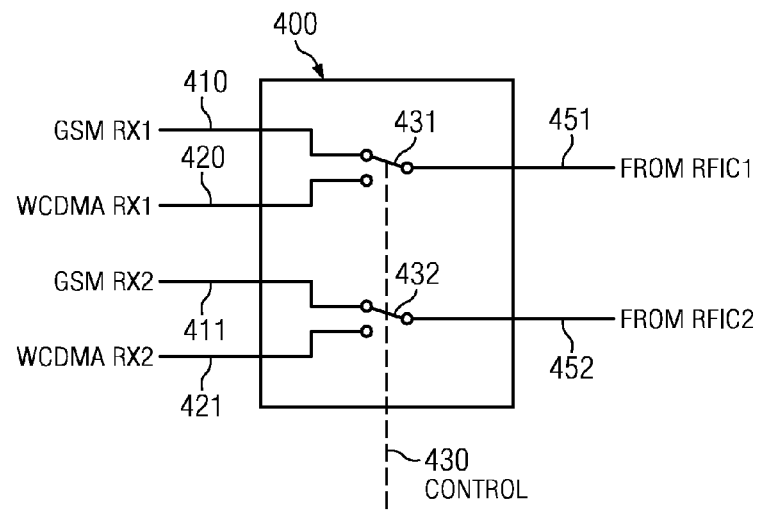
FIG. 4 shows an IQ switch having two switches controlled by one single control interface.

FIG. 4 shows an exemplary implementation of an IQ switch unit 400 with a dual standby and active SIM cards. We can see that one single control interface 430 controls two switches 431, 432 which respectively receive communication signals from RFIC1 and RFIC2 451, 452. The communication signals in this exemplary implementation are using the GSM and WCDMA communication standards. It should be kept in mind that any other communication standards can also be used. Hence, in response to the position of the single control interface 430, both switches 431, 432 can be either in WCDMA position 420, 421 or GSM position 410, 411 and are not independent.

FIG. 5A also shows a detailed exemplary embodiment of an IQ switch unit 500 wherein the IQ switch unit 500 can be upgraded for the required functionality. Two switches 531-1, 531-2 included therein are respectively associated to two different control lines 530-1, 530-2, each control line for each switch is associated a control input. In this exemplary embodiment, the IQ switch 500 is a hardware module used to switch two incoming IQ paths (from RFIC1 540-1 and RFIC2 540-2) to any of the 4 possible outgoing IQ paths (referred as GSM RX1 510-1, GSM RX2 510-2, WCDMA RX1 520-1, WCDMA RX2 520-2). The IQ switch 500 receives control inputs from the two control lines 530-1 and 530-2 that monitor how the switch operates. These control inputs are driven by a SW running in the processor and hence achieve the desired switching functionality based on the requirement.

Thus, the inputs or the communication signals received from the first RFIC1 540-1 can be routed to a first GSM line 510-1 or a first WCDMA line 520-1 independently from the status of the second RFIC2 540-2. Conversely, the inputs or the communication signals received from the second RFIC2 540-2 can be routed to a second GSM line 510-2 or a second WCDMA line 520-2 independently from the status of the first RFIC1 540-1. As previously mentioned, in this exemplary implementation, the communication signals use the GSM and WCDMA communication standards and any other communication standards such as CDMA, HSPA can also be used in a similar embodiment.

Figure 5B:
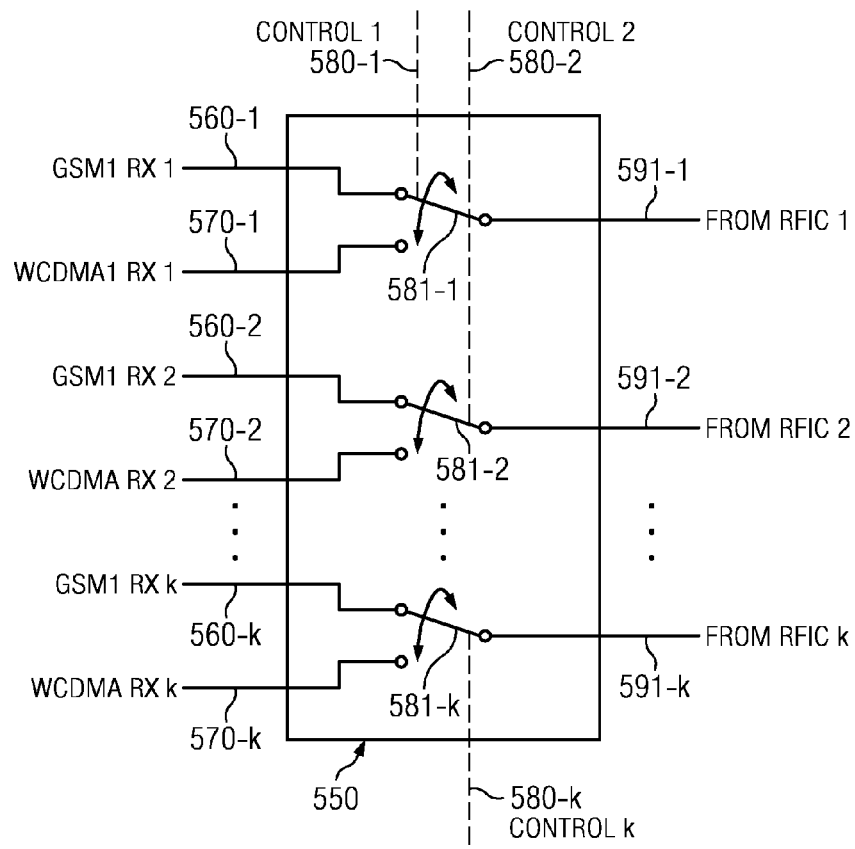
FIG. 5B shows an IQ switch having k switches controlled by k independent control interfaces.

FIG. 5B illustrates a detailed exemplary embodiment of an IQ switch unit 550 which contains a plurality of switches 581-1, 581-2, . . . , 581-k. Each switch is respectively associated to one of the k different control lines 580-1, 580-2, . . . , 580-k. In this exemplary embodiment, the IQ switch 550 is a hardware module used to switch k incoming IQ paths (from RFIC1 591-1 to RFIC2 591-k) to any of the k*2 possible outgoing IQ paths (referred as GSM RX1 560-1, GSM RXk 560-k, WCDMA RX1 570-1, WCDMA RXk 570-k). The IQ switch 500 receives control inputs from the two control lines 530-1 and 530-2 that monitor how the switch operates. These control inputs are driven by a SW running in the processor and hence achieve the desired switching functionality based on the requirement.

Thus, for instance, the inputs of the communication signals from the first RFIC1 591-1 can be routed to a first GSM line 560-1 or a first WCDMA line 570-1 independently from the status of the second RFIC2 591-2. Conversely, the inputs of the communication signals from the second RFIC2 591-2 can be routed to a second GSM line 560-2 or a second WCDMA line 570-2 independently from the status of the first RFIC1 591-1. As previously mentioned, in this exemplary implementation, the communication signals use the GSM and WCDMA communication standards and any other communication standards such as CDMA, HSPA or combination thereof can also be used.

The present invention covers the case wherein the RFIC2 may be a separate Receiver Path for handling the $2^{nd}$ Receiver path. In an exemplary Nokia specific implementation, an RX Diversity path can be reused as an additional separate Receiver Path (RFIC2). The present invention is extended to cover the case, wherein the $2^{nd}$ RFIC Path is a reuse of Rx Diversity path (rather than an addition of a new RFIC2 Path).

Conversely, for an implementation of an IQ switch unit containing a plurality of k switches, an RX Diversity path can also be reused as an additional separate Receiver Path (RFICk). And by extension, the present invention can also cover the case, wherein the $k^{th}$ RFIC Path is a reuse of the Rx Diversity path (rather than an addition of a new RFIC Path).

In another exemplary embodiment, an RX2 is also a Reuse of the Rx Diversity path. However, the present invention can be extended to cover the case wherein the RX2 is a separate Receiver Path for handling the $2^{nd}$ Receiver path. In principle, the processing of Receiver from the diversity path is the same as Processing inputs from an additional separate Receiver.

FIG. 6A illustrates a detailed block diagram of a single Digital Baseband 600 with two WCDMA transmit TX1/2 636-1, 636-2. In this exemplary embodiment, the single Digital Baseband 600 contains several components:

IQ Switch 630: is located in the single Digital Baseband coupled to the HW Accelerators and to the RFICs through the RF IQ Interface 636-1, 636-1, 634-1 and 634-2 to respectively switch the transmission and reception onto the appropriate Path using data buses 629-1, 629-2, 631-1, 632-2, 645-1, 645-2, 647-1, 647-2. The RFICs are coupled to antennas 649-1, 649-2.

RF CONTROL HW 632: The module within the single Digital Baseband that allows the control of the RFIC's in a time accurate manner. In an exemplary Nokia implementation, the RF control is performed in a time accurate manner by the inclusion of a programmable state machine that executes the programmed instructions in deterministic time. The programmed instructions perform write operations to the RFIC registers, thereby enabling the RF control. This module may interface with the RFIC using a Nokia proprietary serial interface for instance. The RF Control HW 632 is connected to the RFICs by control lines 645-1 and 645-2. It is also connected to the Processor 610 by control line 617.

GSM HW ACCELERATOR 614: The module/modules within the single Digital Baseband perform together the GSM receiver chain functionality. The GSM HW ACCELERATOR 614 performs the equalization, demodulation and channel decoding. The input to this GSM HW Accelerator would be the IQ samples from the RFIC and the output would be the decoded bits. The GSM HW Accelerator 614 is connected to the IQ Switch with data buses 625, 627.

WCDMA HW ACCELERATOR 612: The module/modules within the single Digital Baseband perform together the WCDMA receiver chain functionality. The WCDMA HW ACCELERATOR 612 performs the equalization, rake reception and channel decoding in the receiver path. In the transmit path, it performs convolutional encoding, and spreading according to the 3GPP specifications. The WCDMA HW Accelerator 612 is connected to the IQ Switch with data buses 621, 623.

PROCESSOR 610: can be a processor subsystem inside the single Digital Baseband that contains the CPU and associated peripherals that execute the protocol SW code. The Processor subsystem contains the MCU and the DSP, on which the Protocol Stack functionality of GSM and WCDMA are executed. The processor 610 is respectively coupled to the GSM HW Accelerator 612 and to WCDMA HW Accelerator 614 with control lines 613, 615. It is also to the IQ Switch with control line 619.

Two RFIC1/2 640-1, 640-2: The complete chain of processing from IQ samples to up/down conversion, power amplification, and front end processing/filtering for each antenna is contained in each of the RFICs. Each RFIC 640-1, 640-2 is typically a separate module from the single Digital Baseband. Each RFIC interfaces with the single Digital Baseband via a Digital interface (in this exemplary embodiment). However the interface can also be an analog interface (the modification being the addition of an Analog to Digital and/or a Digital to Analog functionality blocks within the single Digital Baseband).

FIG. 6A describes an exemplary system which achieves the Dual SIM (Dual Standby and Dual Active) functionality in a cost effective manner. In the table below, ALL options (or scenarios) can be supported in a 2 Engine solution of a single Digital Baseband. In an exemplary embodiment using a Nokia ASIC with minor modifications, all options (or scenarios) are supported except the scenario of 2 WCDMA Active cases. In another exemplary embodiment, with a Nokia ASIC designed using two WCDMA TX paths as shown in FIG. 6A, all the scenarios shown in the table can be performed.

TABLE 1

Options Supported for a dual SIM embodiment

| | SIM1 | | | |
|---|---|---|---|---|
| SIM2 | GSM IDLE | GSM ACTIVE | WCDMA IDLE | WCDMA ACTIVE |
| GSM IDLE | (#1) | (#2) | (#4) | (#6) |
| GSM ACTIVE | (#2) | (#3) | (#5) | (#7) |
| WCDMA IDLE | X | X | (#8) | X |
| WCDMA ACTIVE | X | X | X | (#9) |

In the following sections, the term SIMX, SIMY are used to refer to the two subscriptions in use and RFICX and RFICY are used to refer to the two RFIC's. The mapping of X and Y to particular entities for example RFIC 1 and RFIC2 is flexible and maybe interchanged.

Figure 6B:
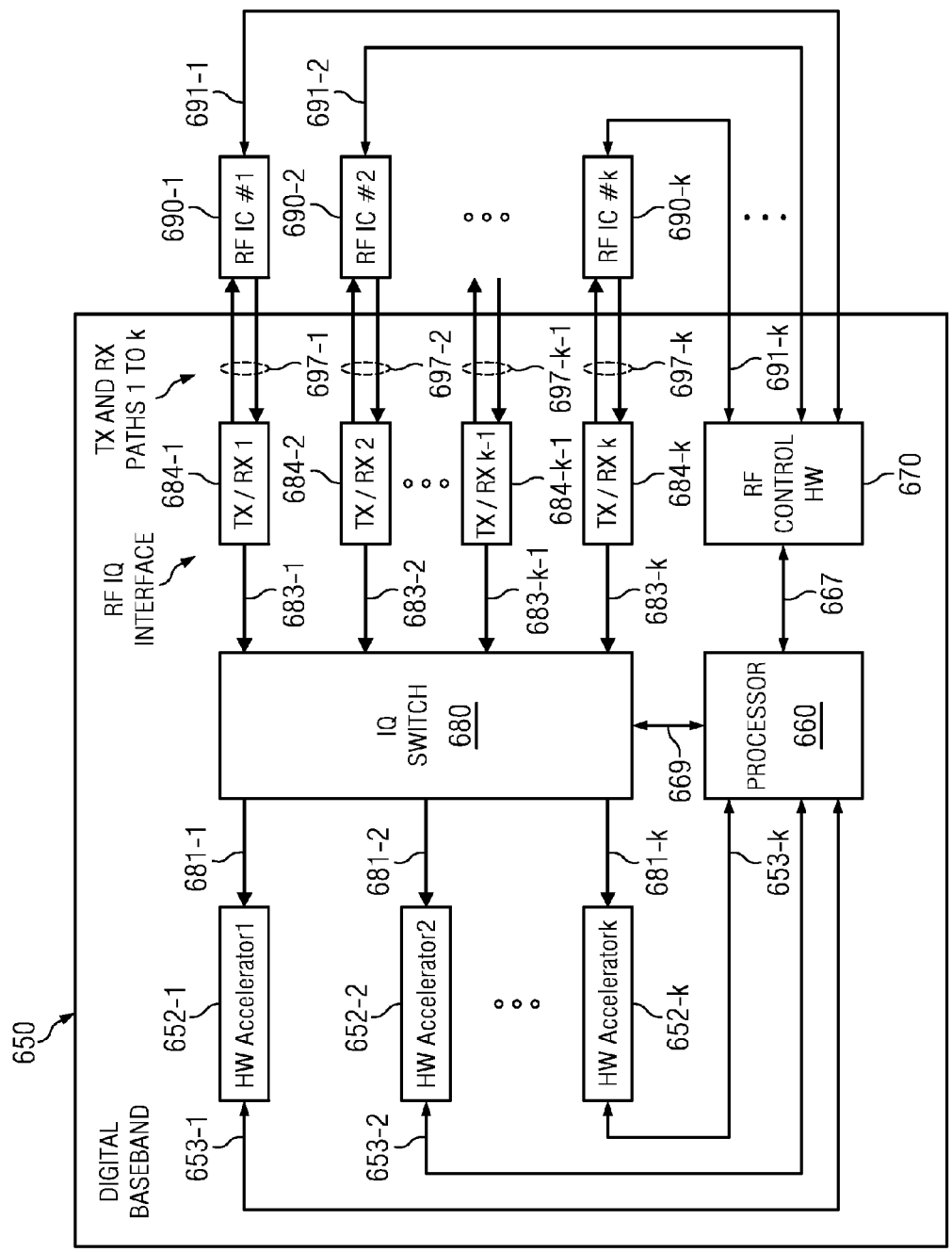
FIG. 6B shows in detail a baseband with k RX and TX paths.

In another exemplary embodiment as shown in FIG. 6B, multiple SIMs card connectors, also referred as HW Accelerator1 to HW Acceleratork, 652-1 to 652-k can be configured to be implemented in a single Digital Baseband 650 in connection with multiple RFIC1 to RFICk, 690-1 to 690-k.

Just like in FIG. 6A, FIG. 6B contains the following components:

IQ Switch 680: is coupled to the HW Accelerators and to the RFICs through the RF IQ Interface 636-1, 636-1, 684-1, . . . , 684-k to respectively switch the transmission and reception onto the appropriate Path using data buses 683-1, . . . , 683-k, 681-1, . . . , 681-k, 697-1, . . . , 697-k. The RFICs are coupled to antennas 649-1, 649-2.

RF CONTROL HW 670: The module within the single Digital Baseband that allows the control of the RFIC's in a time accurate manner. In an exemplary Nokia implementation, the RF control is performed in a time accurate manner by the inclusion of a programmable state machine that executes the programmed instructions in deterministic time. The programmed instructions perform write operations to the RFIC registers, thereby enabling the RF control. This module may interface with the RFIC using a Nokia serial interface for instance. The RF Control HW 670 is connected to the RFICs by control lines 691-1, . . . , 691-k. It is also connected to the Processor 610 by control line 617.

HW ACCELERATOR 652-1 to 652-k: The modules within the single Digital Baseband perform together the GSM or CDMA (or any other standards) receiver chain functionality. The input to the HW Accelerator would be the IQ samples from the RFIC and the output would be the decoded bits. The HW Accelerators are connected to the IQ Switch with data buses 681-1, . . . , 681-k.

PROCESSOR 660: can be a processor subsystem inside the single Digital Baseband that contains the CPU and associated peripherals that execute the protocol SW code. The processor 610 is respectively coupled to the k HW Accelerator with control lines 653-1, . . . , 653-k. It is also to the IQ Switch with control line 669. Processor 660 is also coupled to RF Control HW 670 with control line 667.

k RFIC 690-1, . . . 690-k: The complete chain of processing from IQ samples to up/down conversion, power amplification, and front end processing/filtering for each antenna is contained in each of the RFICs. Each RFIC 690-1, . . . , 690-k is typically a separate module from the single Digital Baseband. Each RFIC interfaces with the single Digital Baseband via a Digital interface (in this exemplary embodiment). However the interface can also be an analog interface (the modification being the addition of an Analog to Digital and/or a Digital to Analog functionality blocks within the single Digital Baseband).

Scenario #1 as shown in Table 1 is the scenario with GSM IDLE, GSM IDLE. In this scenario #1, the SIMX and SIMY need to be able to perform the signal reception from the base stations. These signal receptions may differ in frequency and overlap in time. In this case, one of the SIM's, SIMX for example, would use RFICX and the other SIMY would use RFICY for the purpose of the signal reception. The IQ switch is programmed by the processor to route the IQ samples from RFICX and RFICY to the GSM HW ACCELERATOR, and the GSM HW ACCELERATOR can perform further reception steps on them sequentially.

Scenario #2 GSM ACTIVE, GSM IDLE: In this scenario #2, one of the SIMX requires to receive and transmit to the base station whereas SIMY requires reception only. These receptions and the transmission may differ in frequency and overlap in time with each other. The IQ switch is configured as in case 1 to route both IQ streams from RFIC1 and RFIC2 to the GSM HW ACCELERATOR and the reception path functions exactly as in case 1. In the case of SIMX the transmit data bits are sent to the RFICX via the RF control hardware.

Scenario #3 GSM ACTIVE, GSM ACTIVE: In this scenario #3, both SIMX and SIMY requires receiving and transmitting to the base station. These operations may be in different frequencies and overlap in time with each other. The IQ switch is configured as in case 1 and the reception path functions exactly as in case 1. In this case the GSM transmit data needs for SIMX and SIMY needs to be routed to RFICX and RFICY respectively via the RF control hardware.

Scenario #4 GSM IDLE, WCDMA IDLE: In this scenario #4, SIMX would require reception in GSM mode whereas SIMY would require reception in WCDMA mode. In this case the IQ switch is configured to route the IQ samples from RFICX to the GSM HW ACCELERATOR and IQ samples from RFICY are routed to the WCDMA HW ACCELERATOR block. This functionality is not available in the existing digital baseband implementation. This functionality could be achieved by enhancing the IQ switch implementation to support this case (See FIG. 6). Once the IQ samples are routed to the respective sides, then the GSM and WCDMA HW ACCELERATOR blocks function in parallel to process the IQ samples and required reception can be made.

Scenario #5 GSM ACTIVE, WCDMA IDLE: In this scenario #5, the SIMX would require GSM reception and transmission to the base station and SIMY the WCDMA reception. The IQ switch is configured according to case 4 (above). The reception path functions identical to the case 4. The GSM transmit data required by SIMX is routed to the RFIC via the RF control HW.

Scenario #6 GSM IDLE, WCDMA ACTIVE: In this scenario #6, the SIMX would require GSM reception and SIMY WCDMA reception and transmission. The IQ switch is configured as in case 4 for this scenario. The reception functions identical to the case 4 (above). The WCDMA transmit IQ samples required by SIMY are generated in the WCDMA HW ACCELERATOR block, and are sent to RFICY via the RF IQ interface.

Scenario #7 GSM ACTIVE, WCDMA ACTIVE: In this scenario #7, the SIMX would require GSM reception and transmission to the base station and SIMY WCDMA reception and transmission. The IQ switch is configured as in case 4 for this scenario. The reception functions identical to the case 4. The WCDMA transmit IQ samples required by SIMY are generated in the WCDMA HW ACCELERATOR block, and are sent to RFICY via the RF IQ interface. The GSM transmit data required by SIMX is routed to the RFIC via the RF control HW.

Scenario #8 WCDMA IDLE, WCDMA IDLE: In this scenario #8, the SIMX and SIMY would require reception in WCDMA mode. The frequencies could be different and also they are essentially overlapping in time. The IQ switch is configured to route the IQ samples from RFICX and RFICY to the WCDMA HW ACCELERATOR. The WCDMA HW ACCELERATOR has a capability to receive two IQ streams at the same time due to the support of diversity. Hence this reception can be achieved.

Scenario #9 WCDMA ACTIVE, WCDMA ACTIVE: In this scenario #9, the SIMX and SIMY would require WCDMA reception and transmission to the base station. This scenario cannot be supported by this solution as there is only one hardware block to perform transmission in WCDMA HW ACCELERATOR block. The enhancement required to have this functionality in the existing baseband ASIC is non-trivial. Hence this scenario is not supported by this solution.

Figure 7A:
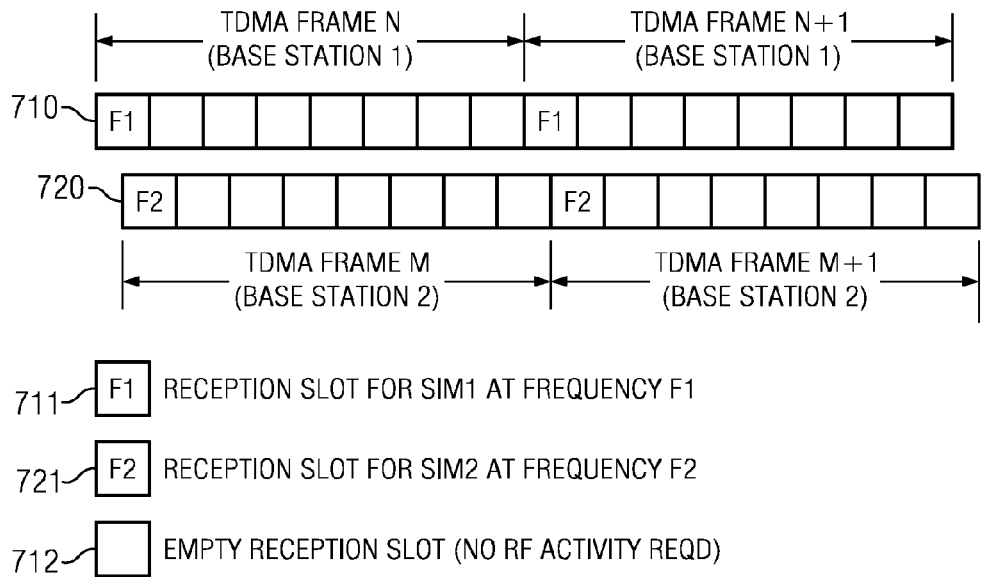
FIG. 7A shows two TDMA frames for two SIM card connectors.

FIG. 7A illustrates an exemplary TDMA frame structure for an embodiment which comprises 2 base stations. The first frame 710 contains two successive TDMA frame N and TDMA frame N+1 from Base Station 1. Each of these TDMA frame contains a heading slot which is a reception slot 711 dedicated to SIM1 at frequency F1. The second frame 720 contains two successive TDMA frame M and TDMA frame M+1 from Base Station 2. Each of these TDMA frame contains a heading slot which is a reception slot 721 dedicated to SIM2 at frequency F2. In this exemplary TDMA frame structure, there are empty slots 712 which follow the reception slots 711 and 721.

Figure 7B:
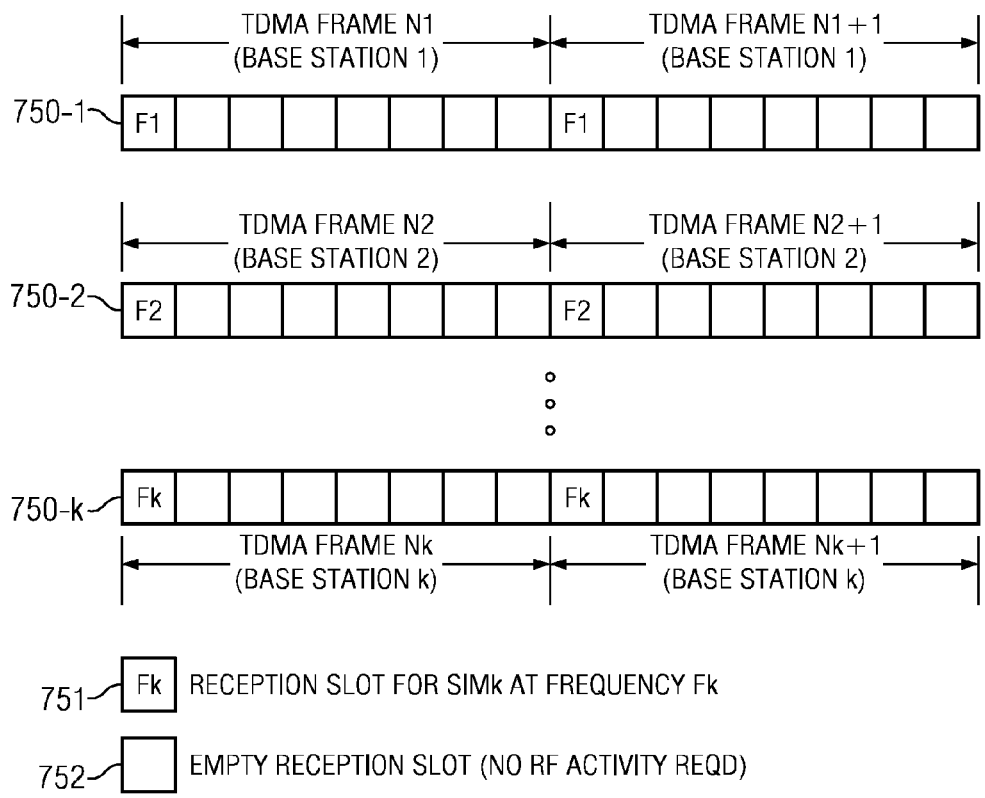
FIG. 7B shows k TDMA frames for k SIM card connectors.

FIG. 7B illustrates an exemplary TDMA frame structure for an embodiment which comprises k base stations. The first frame 750-1 contains two successive TDMA frame N1 and TDMA frame N1+1 from Base Station 1. Each of these TDMA frame contains a heading slot which is a reception slot 711 dedicated to SIM1 at frequency F1. The second frame 750-2 contains two successive TDMA frame N2 and TDMA frame N2+1 from Base Station 2. Each of these TDMA frame contains a heading slot which is a reception slot 721 dedicated to SIM2 at frequency F2. The k frame 750-k contains two successive TDMA Nk and TDMA frame Nk+1 from Base Station k. In this exemplary TDMA frame structure, there are empty slots 712 which follow the reception slots 711 and 721.

Figure 8A:
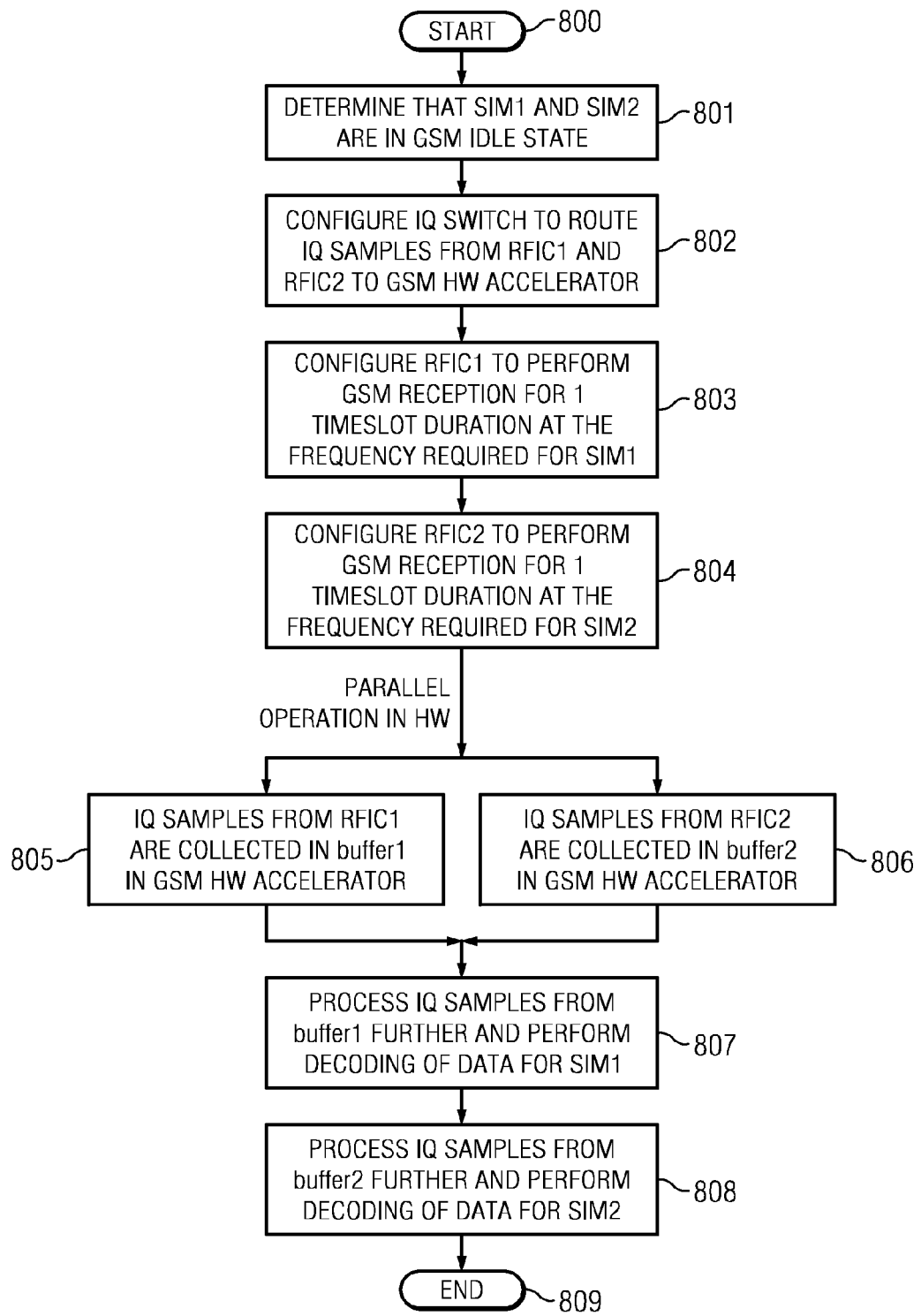
FIG. 8A is a flow diagram of a scenario #1 showing operations of two GSM IDLE in the implementation of a two SIM card connectors.

FIG. 8A illustrates a flowchart of scenario#1 with GSM Idle, GSM Idle. After the process is started at step 800, it is further determined if SIM1 and SIM2 are in GSM IDLE state at step 801.

At step 802, the IQ switch is configured to route the IQ samples from RFIC1 and RFIC2 to the GSM HW Accelerators.

At step 803, the RFIC1 is configured to perform the GSM reception for 1 timeslot duration at the frequency required for SIM1.

At step 804, the RFIC1 is configured to perform the GSM reception for 1 timeslot duration at the frequency required for SIM2.

At steps 805 and 806 which are performed in parallel, the IQ samples from RFIC1 and RFIC2 are respectively collected in buffer1 and buffer2 in the corresponding GSM HW Accelerators.

At step 807, the IQ samples are further processed from buffer1 and the data decoding is performed for SIM1.

At step 808, the IQ samples are further processed from buffer2 and the data decoding is performed for SIM2 before the process ends at step 809.

Figure 8B:
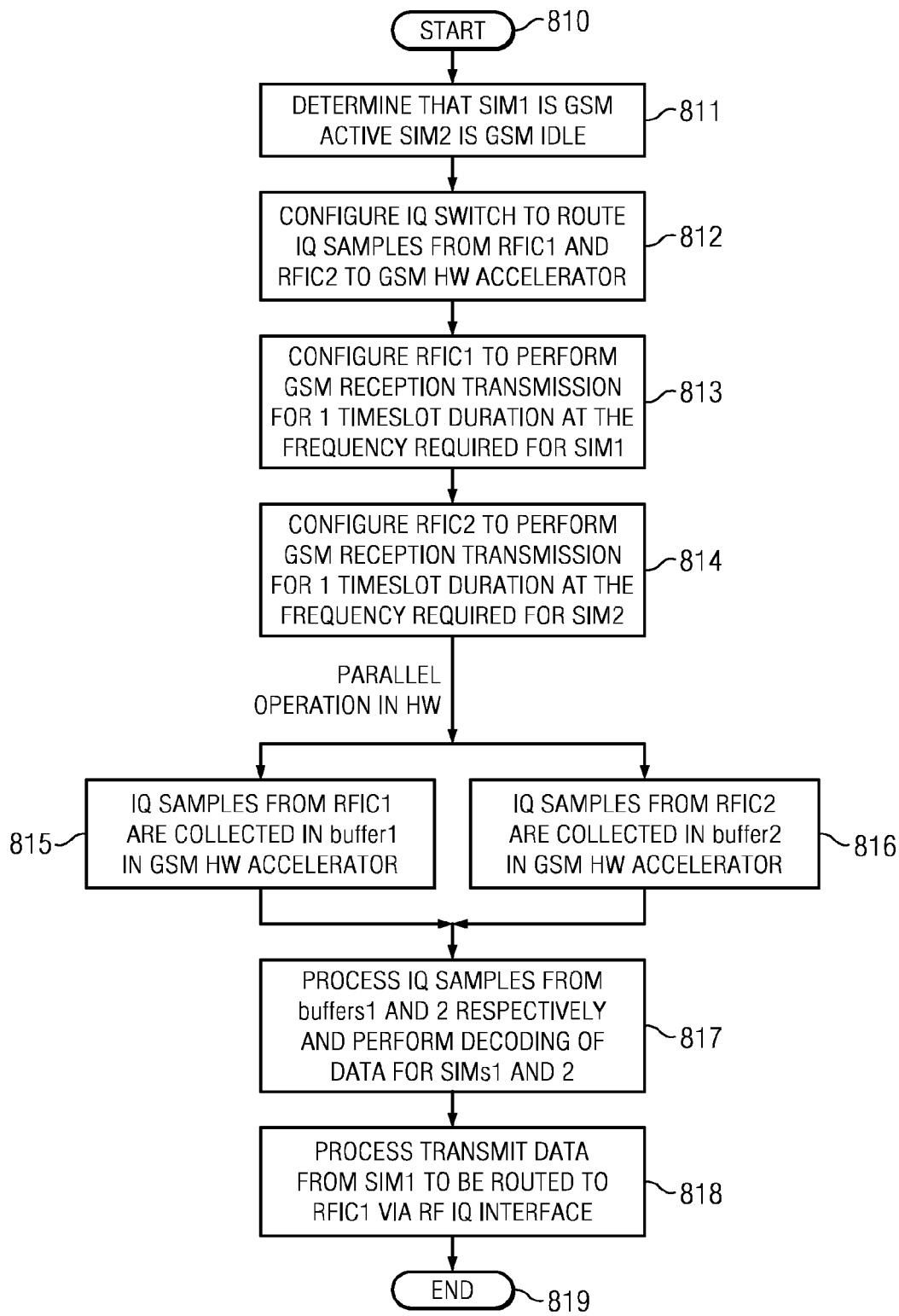
FIG. 8B is a flow diagram of a scenario #2 showing operations of one GSM ACTIVE and one GSM IDLE in the implementation of two SIM card connectors.

FIG. 8B illustrates a flow chart of scenario#2 with GSM ACTIVE, GSM IDLE. After the process is started at step 810, it is further determined if SIM1 and SIM2 are respectively in GSM ACTIVE and GSM IDLE state at step 811.

At step 812, the IQ switch is configured to route the IQ samples from RFIC1 and RFIC2 to the GSM HW Accelerators.

At step 813, the RFIC1 is configured to perform the GSM reception and transmission for 1 timeslot duration at the frequency required for SIM1.

At step 814, the RFIC1 is configured to perform the GSM reception and transmission for 1 timeslot duration at the frequency required for SIM2.

At steps 815 and 816 which are performed in parallel, the IQ samples from RFIC1 and RFIC2 are respectively collected in buffer1 and buffer2 in the corresponding GSM HW Accelerators.

At step 817, the IQ samples are further processed from buffers1&2 and the data decoding is performed for SIM1&2.

At step 818, the transmit data are processed from SIM1 and routed to the RFIC1 via RF IQ Interface before the process ends at step 819.

Figure 8C:
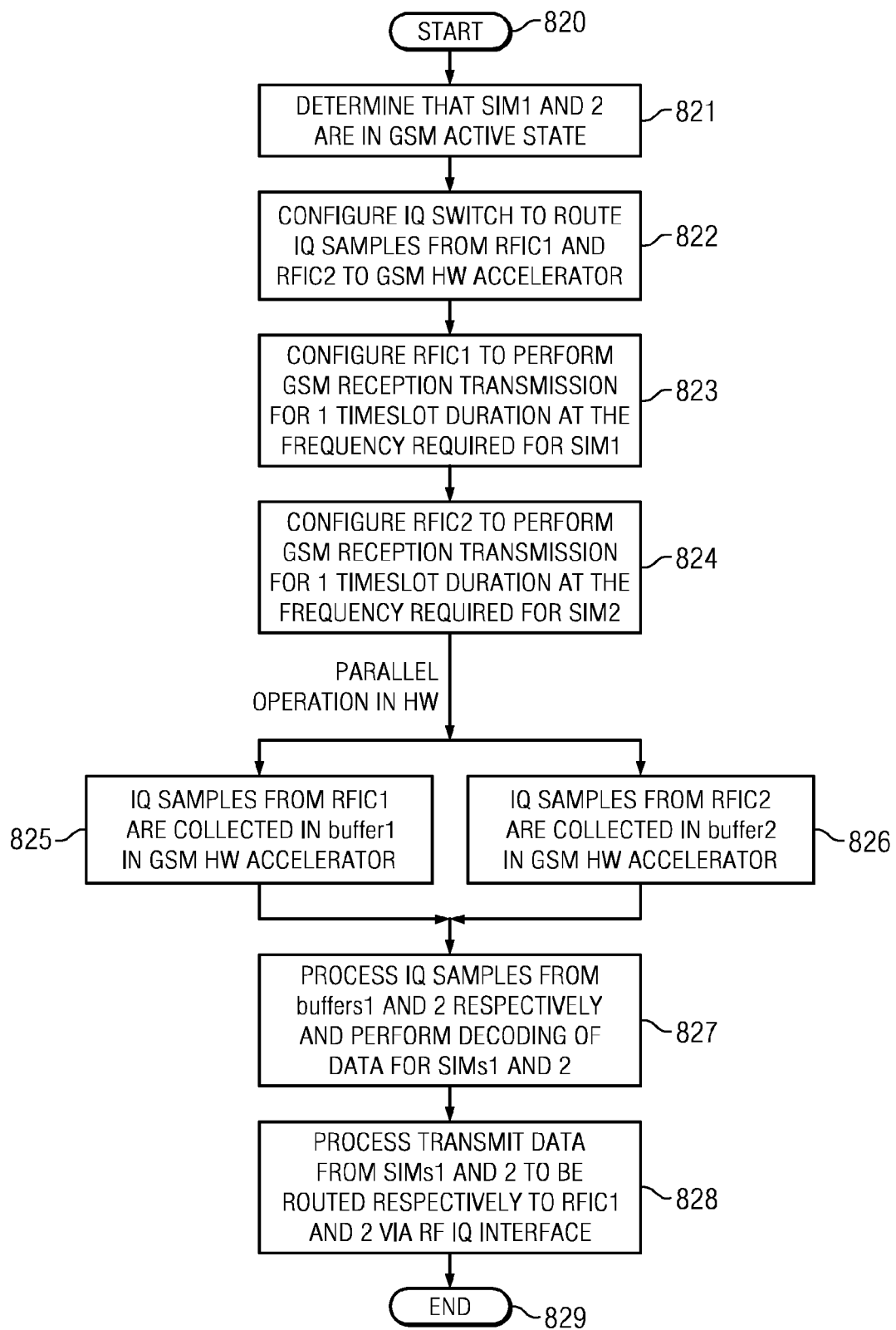
FIG. 8C is a flow diagram of a scenario #3 showing operations of one GSM ACTIVE and one GSM ACTIVE.

FIG. 8C illustrates a flow chart of scenario#3 for GSM ACTIVE, GSM ACTIVE. After the process is started at step 820, it is further determined if SIM1 and SIM2 are in GSM ACTIVE state at step 821.

At step 822, the IQ switch is configured to route the IQ samples from RFIC1 and RFIC2 to the GSM HW Accelerators.

At step 823, the RFIC1 is configured to perform the GSM reception and transmission for 1 timeslot duration at the frequency required for SIM1.

At step 824, the RFIC1 is configured to perform the GSM reception and transmission for 1 timeslot duration at the frequency required for SIM2.

At steps 825 and 826 which are performed in parallel, the IQ samples from RFIC1 and RFIC2 are respectively collected in buffer1 and buffer2 in the corresponding GSM HW Accelerators.

At step 827, the IQ samples are further processed from buffer1&2 and the data decoding is performed for SIM1&2.

At step 828, the transmit data are processed from SIM1&2 and routed to the RFIC1&2 via RF IQ Interface before the process ends at step 829.

Figure 8D:
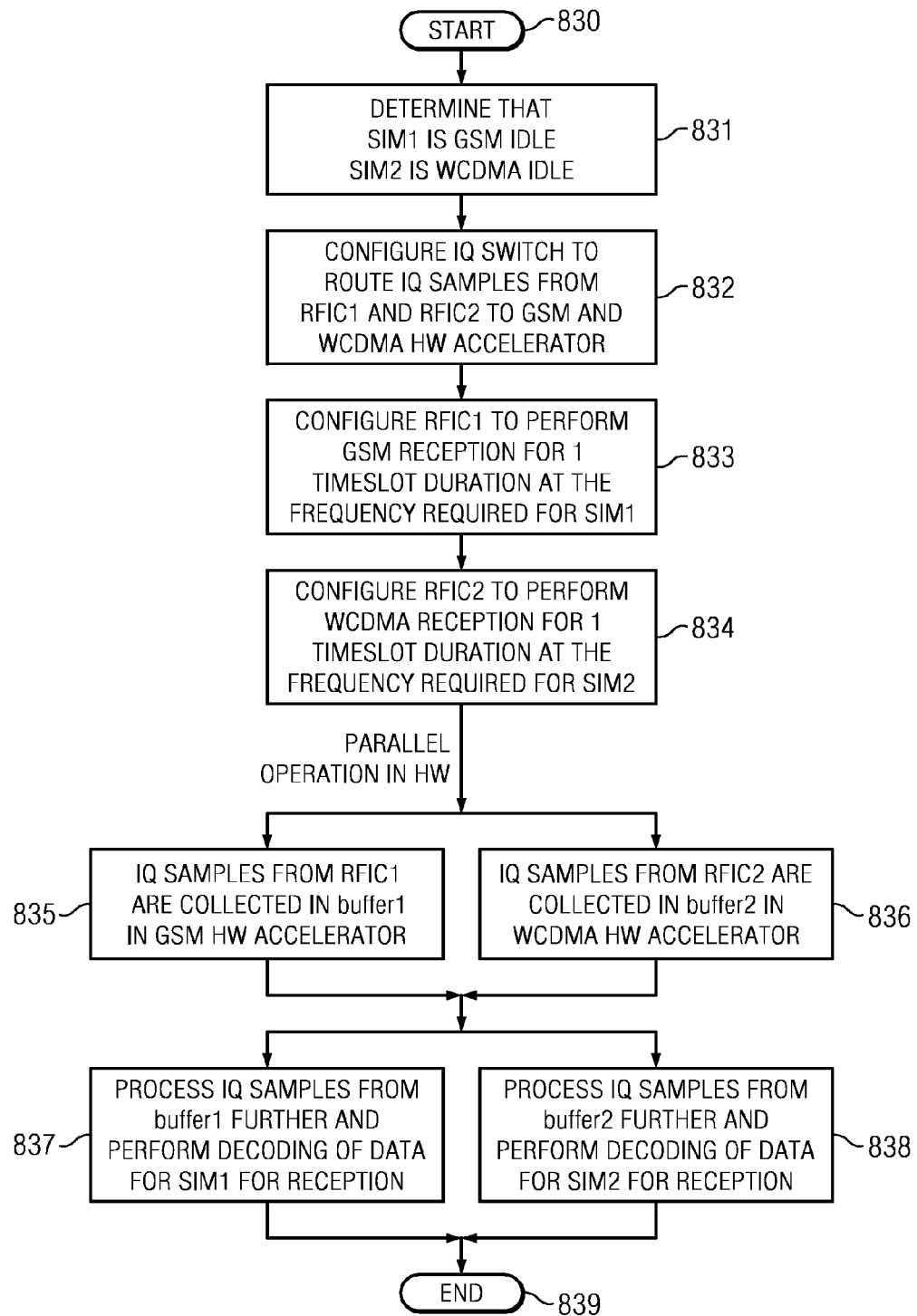
FIG. 8D is a flow diagram of a scenario #4 showing operations of one GSM IDLE and one WCDMA IDLE.

FIG. 8D illustrates a flow chart of scenario#4 for GSM IDLE, WCDMA IDLE. After the process is started at step 830, it is further determined if SIM1 and SIM2 are respectively in GSM IDLE and WCDMA IDLE states at step 831.

At step 832, the IQ switch is configured to route the IQ samples from RFIC1 and RFIC2 to the GSM HW and WCDMA HW Accelerators.

At step 833, the RFIC1 is configured to perform the GSM reception for 1 timeslot duration at the frequency required for SIM1.

At step 834, the RFIC1 is configured to perform the WCDMA reception for 1 timeslot duration at the frequency required for SIM2.

At steps 835 and 836 which are performed in parallel, the IQ samples from RFIC1 and RFIC2 are respectively collected in buffer1 and buffer2 in the corresponding GSM HW and WCDMA HW Accelerators.

At step 837, the IQ samples are further processed from buffer1 and the data decoding is performed for SIM1.

At step 838, the IQ samples are further processed from buffer2 and the data decoding is performed for SIM2 before the process ends at step 809.

Figure 8E:
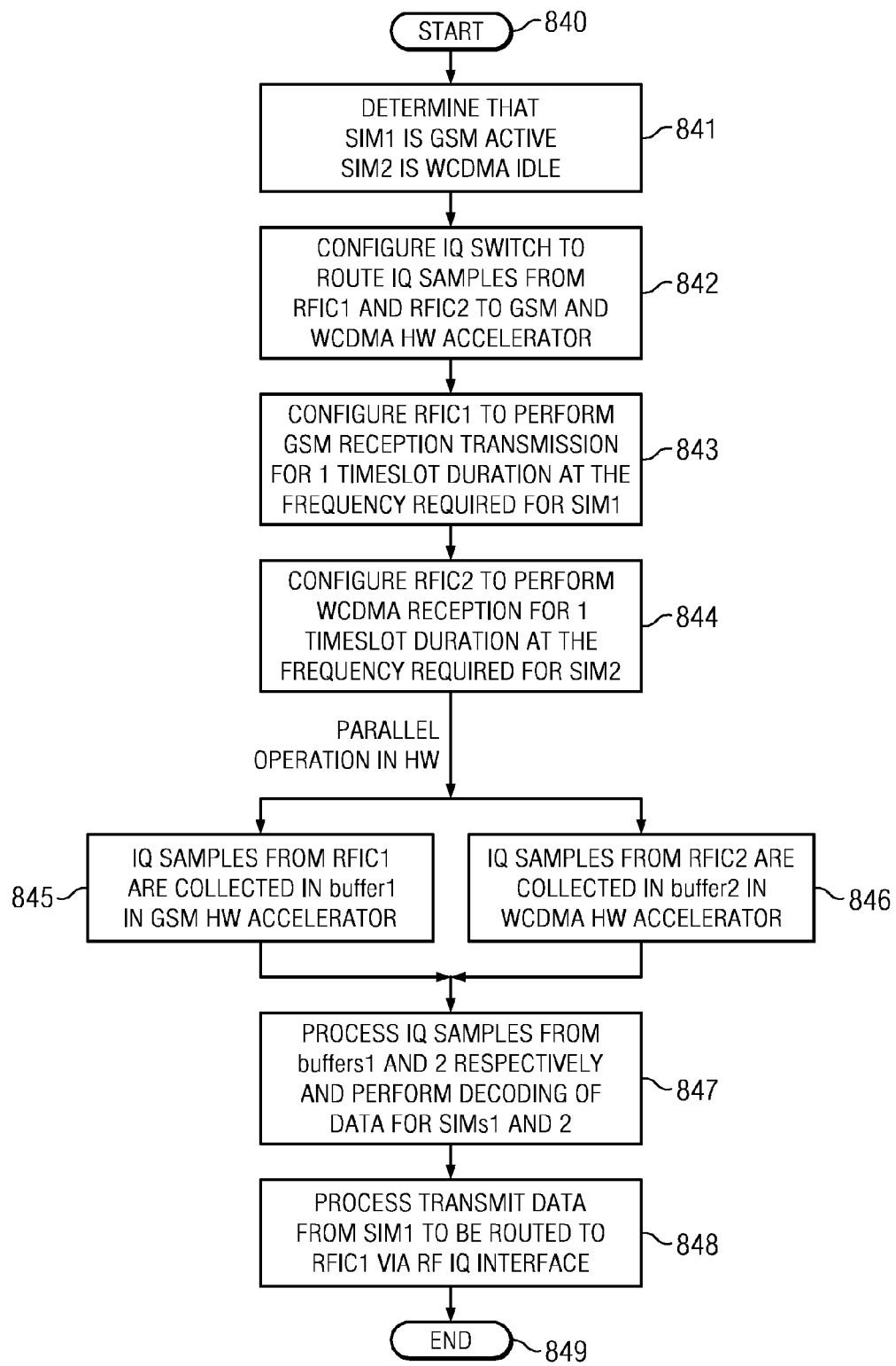
FIG. 8E is a flow diagram of a scenario #5 showing operations of one GSM ACTIVE and one WCDMA IDLE.

FIG. 8E illustrates a flow chart of scenario#5 for GSM ACTIVE, WCDMA IDLE. After the process is started at step 840, it is further determined if SIM1 and SIM2 are in GSM ACTIVE and WCDMA IDLE states at step 841.

At step 842, the IQ switch is configured to route the IQ samples from RFIC1 and RFIC2 to the GSM HW and WCDMA HW Accelerators.

At step 843, the RFIC1 is configured to perform the GSM reception and transmission for 1 timeslot duration at the frequency required for SIM1.

At step 844, the RFIC1 is configured to perform the WCDMA reception for 1 timeslot duration at the frequency required for SIM2.

At steps 845 and 846 which are performed in parallel, the IQ samples from RFIC1 and RFIC2 are respectively collected in buffer1 and buffer2 in the corresponding GSM HW and WCDMA HW Accelerators.

At step 847, the IQ samples are further processed from buffers1&2 and the data decoding is performed for SIM1&2.

At step 848, the transmit data are processed from SIM1 and routed to the RFIC1 via RF IQ Interface before the process ends at step 849.

Figure 8F:
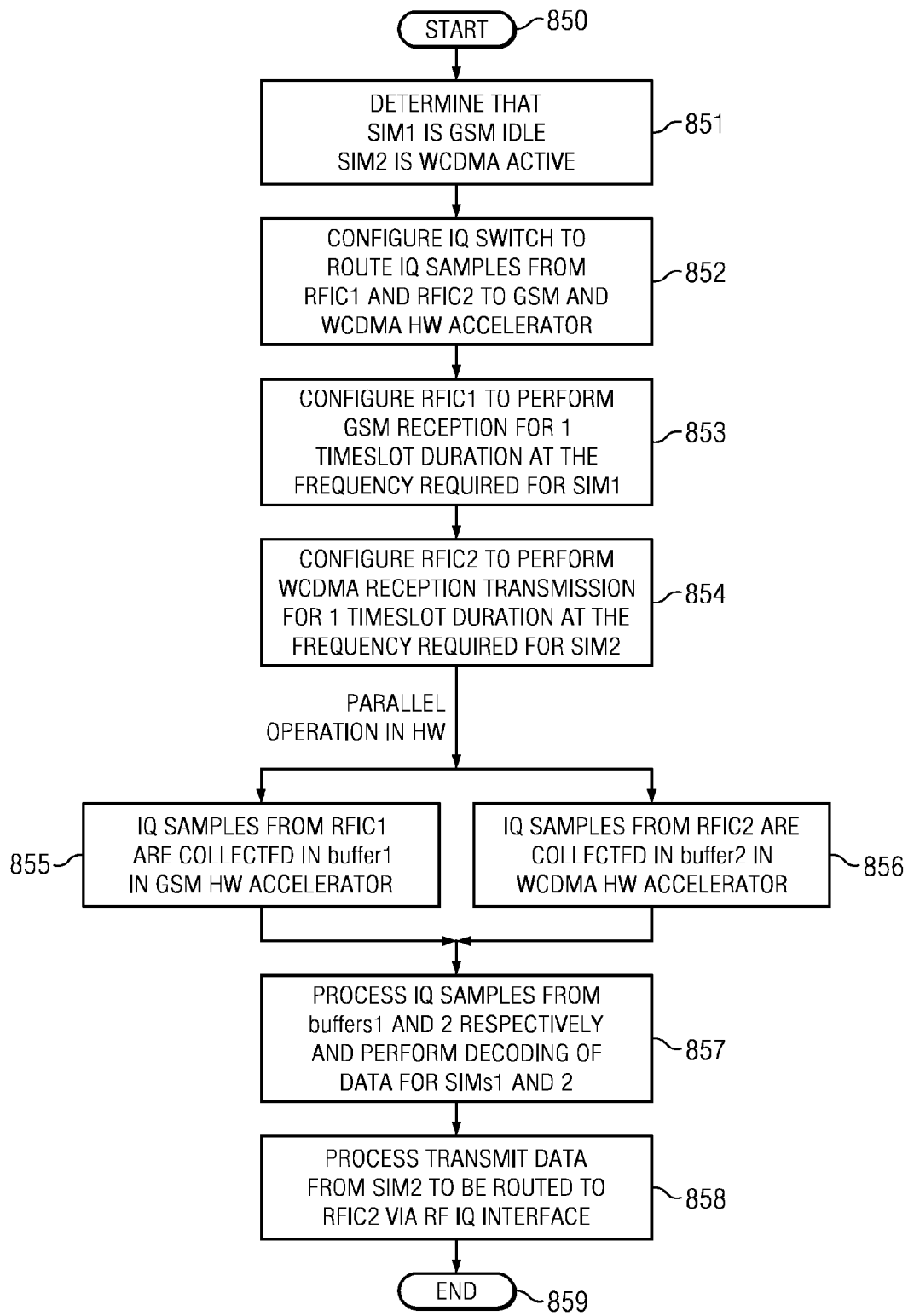
FIG. 8F is a flow diagram of a scenario #6 showing operations of one GSM IDLE and one WCDMA ACTIVE.

FIG. 8F illustrates a flow chart of scenario#6 for GSM IDLE, WCDMA ACTIVE. After the process is started at step 850, it is further determined if SIM1 and SIM2 are in GSM ACTIVE and WCDMA IDLE states at step 851.

At step 852, the IQ switch is configured to route the IQ samples from RFIC1 and RFIC2 to the GSM HW and WCDMA HW Accelerators.

At step 853, the RFIC1 is configured to perform the GSM reception and transmission for 1 timeslot duration at the frequency required for SIM1.

At step 854, the RFIC1 is configured to perform the WCDMA reception and transmission for 1 timeslot duration at the frequency required for SIM2.

At steps 855 and 856 which are performed in parallel, the IQ samples from RFIC1 and RFIC2 are respectively collected in buffer1 and buffer2 in the corresponding GSM HW and WCDMA HW Accelerators.

At step 857, the IQ samples are further processed from buffers1&2 and the data decoding is performed for SIM1&2.

At step 858, the transmit data are processed from SIM2 and routed to the RFIC2 via RF IQ Interface before the process ends at step 859.

Figure 8G:
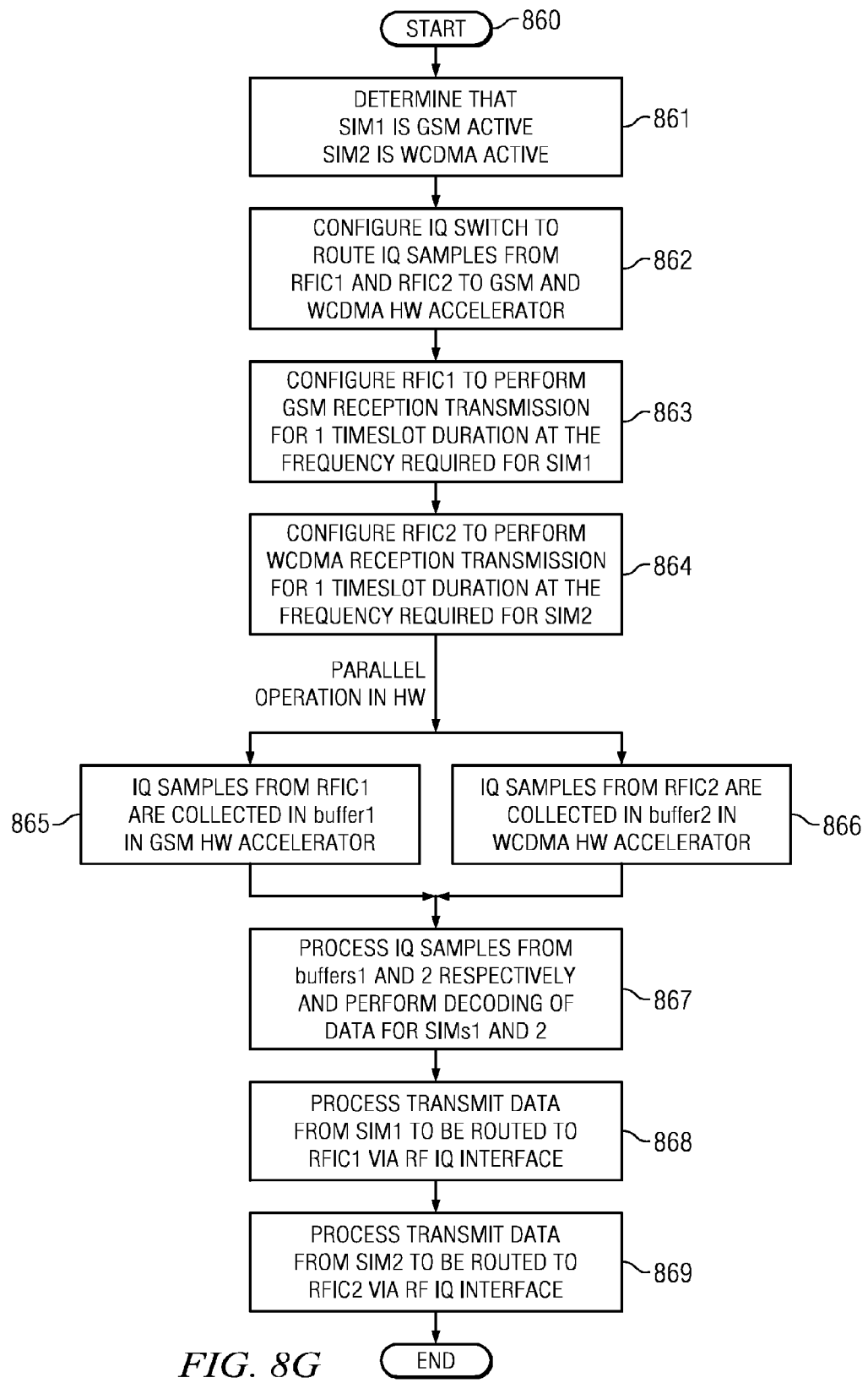
FIG. 8G is a flow diagram of a scenario #7 showing operations of one GSM ACTIVE and one WCDMA ACTIVE.

FIG. 8G illustrates a flow chart of scenario#7 for GSM ACTIVE, WCDMA ACTIVE. After the process is started at step 860, it is further determined if SIM1 and SIM2 are in GSM ACTIVE and WCDMA IDLE states at step 861.

At step 862, the IQ switch is configured to route the IQ samples from RFIC1 and RFIC2 to the GSM HW and WCDMA HW Accelerators.

At step 863, the RFIC1 is configured to perform the GSM reception and transmission for 1 timeslot duration at the frequency required for SIM1.

At step 864, the RFIC1 is configured to perform the WCDMA reception and transmission for 1 timeslot duration at the frequency required for SIM2.

At steps 865 and 866 which are performed in parallel, the IQ samples from RFIC1 and RFIC2 are respectively collected in buffer1 and buffer2 in the corresponding GSM HW and WCDMA HW Accelerators.

At step 867, the IQ samples are further processed from buffers1&2 and the data decoding is performed for SIM1&2.

At step 868, the transmit data are processed from SIM1 and routed to the RFIC1 via RF IQ Interface.

At step 869, the transmit data are processed from SIM2 and routed to the RFIC2 via RF IQ Interface before the process ends.

Figure 8H:
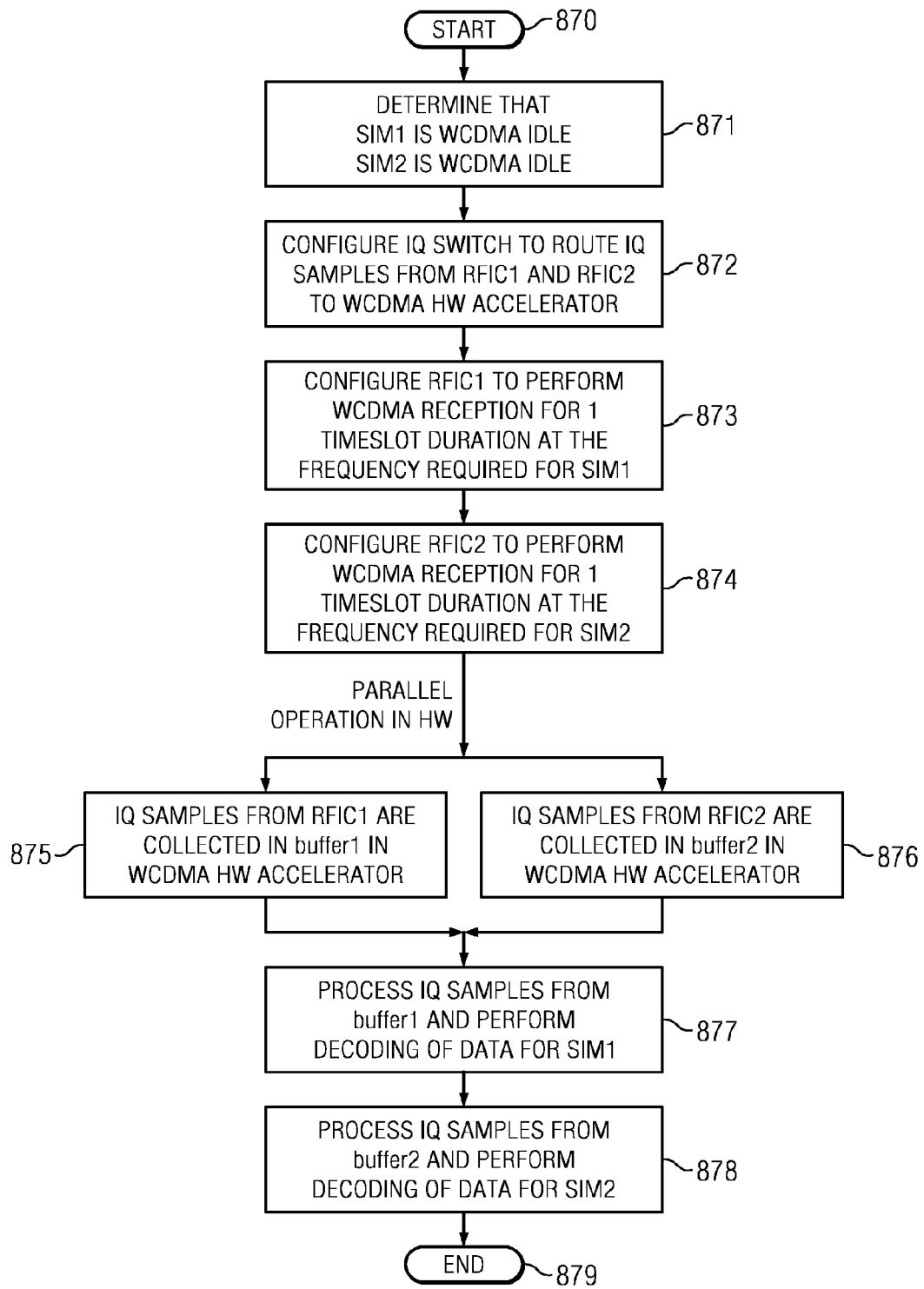
FIG. 8H is a flow diagram of a scenario #8 showing operations of one WCDMA IDLE and one WCDMA IDLE.

FIG. 8H illustrates a flow chart of scenario#8 for WCDMA IDLE, WCDMA IDLE. After the process is started at step 870, it is further determined if SIM1 and SIM2 are in WCDMA IDLE and WCDMA IDLE states at step 871.

At step 872, the IQ switch is configured to route the IQ samples from RFIC1 and RFIC2 to the WCDMA HW Accelerators.

At step 873, the RFIC1 is configured to perform the WCDMA reception for 1 timeslot duration at the frequency required for SIM1.

At step 874, the RFIC1 is configured to perform the WCDMA reception for 1 timeslot duration at the frequency required for SIM2.

At steps 875 and 876 which are performed in parallel, the IQ samples from RFIC1 and RFIC2 are respectively collected in buffer1 and buffer2 in the corresponding WCDMA HW Accelerators.

At step 877, the IQ samples are further processed from buffer1 and the data decoding is performed for SIM1.

At step 878, the IQ samples are further processed from buffer2 and the data decoding is performed for SIM2 before the process ends at step 879.

Figure 8I:
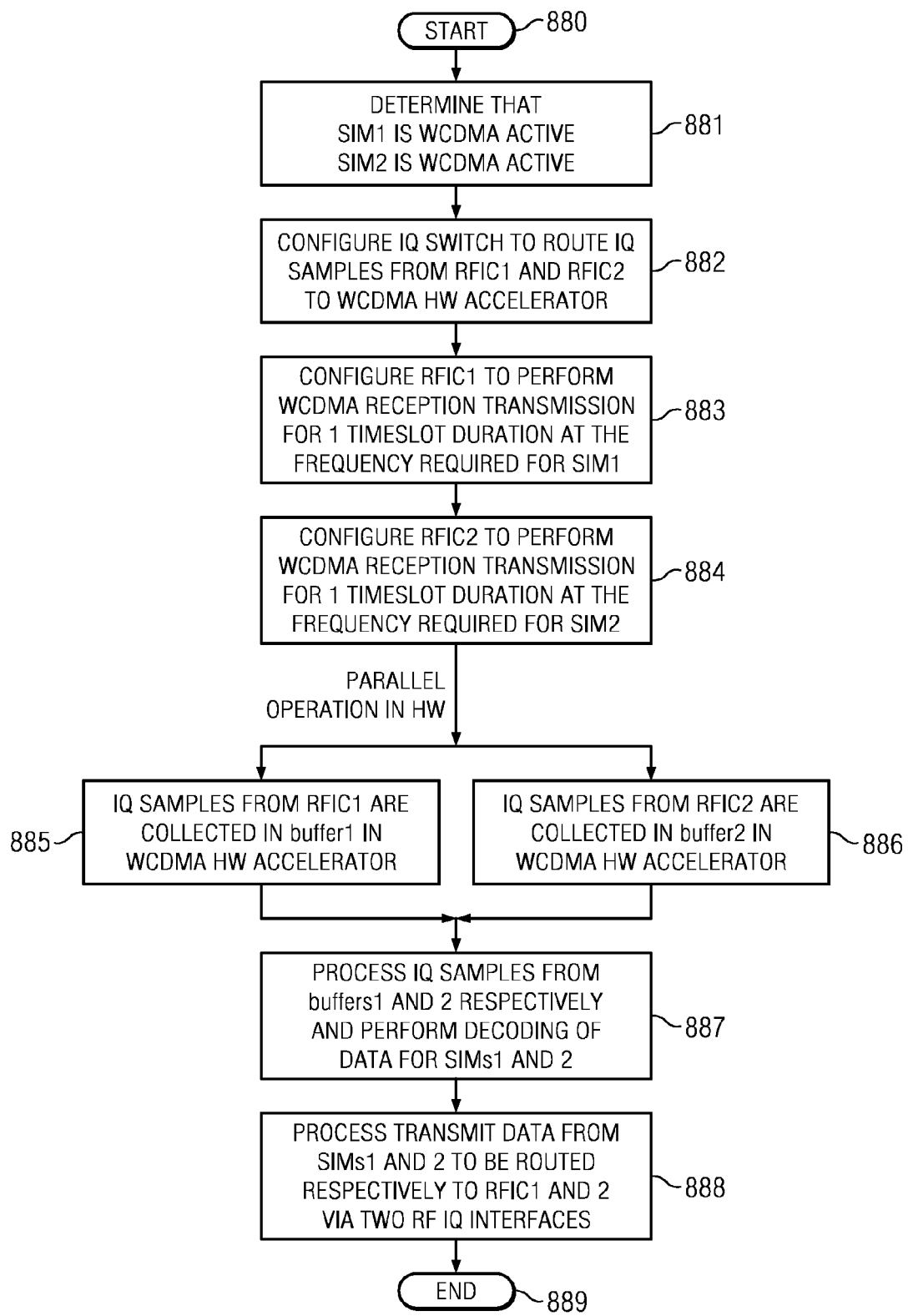
FIG. 8I is a flow diagram of a scenario #9 showing operations of one WCDMA ACTIVE and one WCDMA ACTIVE.

FIG. 8I illustrates a flow chart of scenario#9 for WCDMA ACTIVE, WCDMA ACTIVE. After the process is started at step 870, it is further determined if SIM1 and SIM2 are in WCDMA ACTIVE and WCDMA ACTIVE states at step 881.

At step 882, the IQ switch is configured to route the IQ samples from RFIC1 and RFIC2 to the WCDMA HW Accelerators.

At step 883, the RFIC1 is configured to perform the WCDMA reception and transmission for 1 timeslot duration at the frequency required for SIM1.

At step 884, the RFIC1 is configured to perform the WCDMA reception and transmission for 1 timeslot duration at the frequency required for SIM2.

At steps 885 and 886 which are performed in parallel, the IQ samples from RFIC1 and RFIC2 are respectively collected in buffer1 and buffer2 in the corresponding WCDMA HW Accelerators.

At step 887, the IQ samples are further processed from buffers1&2 and the data decoding is performed for SIM 1&2.

At step 888, the transmit data are processed from SIM 1&2 and routed respectively to the RFIC1&2 via the RF IQ Interface before the process ends at step 889.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

We claim:

1. A method, comprising:
detecting, by a mobile terminal, a state of at least a first subscriber identity module card connector and an associated first communication path and a second subscriber identity module card connector and an associated second communication path, wherein the mobile terminal includes a single digital baseband circuitry to enable active and simultaneous dual talk via switch circuitry configured to selectively couple the first subscriber identity module card connector and the first communication path to a first RF circuitry and to selectively couple the second subscriber identity module card connector and the second communication path to the second RF circuitry, wherein the switch circuitry comprises an in-phase and quadrature phase switch configured to enable the active and simultaneous dual talk by at least providing active paths for corresponding in-phase and quadrature phase samples to the first communication path and the second communication path;
processing, by the mobile terminal, communication signals received and/or to be transmitted;
generating a control signal to select at least the first communication path dedicated, at the single digital baseband circuitry, to the first subscriber identity module card connector or to select the second communication path dedicated, at the single digital baseband circuitry, to the second subscriber identity module card connector; and
switching, at the single digital baseband circuitry including the switch circuitry, the communication signals to the selected first communication path or the selected second communication path to enable the active and simultaneous dual talk use of the corresponding subscriber identity module associated with the selected path.

2. The method of claim 1, wherein the switch circuitry couples to the first RF circuitry via an in-phase and quadrature phase interface at the single baseband processor, and wherein the switch circuitry couples to the second RF circuitry via the in-phase and quadrature phase interface.

3. The method of claim 1, wherein the first subscriber identity module card connector and the second subscriber identity module card connector are defined according to a priority.

4. The method of claim 1, wherein the first subscriber identity module card connector and the second subscriber identity module card connector are defined with a priority card connector and at least one secondary card connector.

5. The method of claim 1, wherein the first subscriber identity module card connector and the second subscriber identity module card connector are coupled to a plurality of radio frequency integrated circuits, each of the plurality of radio frequency integrated circuits includes a programmable state machine that executes programmed instructions, wherein the programmed instructions perform write instructions to the radio frequency integrated circuits registers, thereby enabling RF control.

6. The method of claim 1, wherein the first subscriber identity module connector enables a GSM receiver chain.

7. The method of claim 6, wherein the GSM receiver chain is performed with an equalization, demodulation, and channel decoding.

8. The method of claim 1, wherein the first subscriber identity module connector enables a WCDMA receiver chain.

9. The method of claim 8, wherein the WCDMA receiver chain is performed with an equalization, rake reception, and channel decoding in a receiver path, and convolutional encoding in a transmit path, and spreading.

10. The method of claim 1, wherein the mobile terminal includes a control processor unit and associated peripherals that execute protocol codes.

11. The method of claim 10, wherein the mobile terminal includes at least one processor on which protocol stack functionality of GSM and WCDMA are executed.

12. An apparatus, comprising:
at least one processor; and
at least one memory including computer program code, wherein the at least one memory and the computer program code are configured to, with the at least one processor, cause the apparatus to perform at least the following:
 detect, by the apparatus, a state of at least a first subscriber identity module card connector and an associated first communication path and a second subscriber identity module card connector and an associated second communication path, wherein the apparatus includes a single digital baseband circuitry to enable active and simultaneous dual talk via switch circuitry configured to selectively couple the first subscriber identity module card connector and the first communication path to a first RF circuitry and to selectively couple the second subscriber identity module card connector and the second communication path to the second RF circuitry, wherein the switch circuitry comprises an in-phase and quadrature phase switch configured to enable the active and simultaneous dual talk by at least providing active paths for corresponding in-phase and quadrature phase samples to the first communication path and the second communication path;
 process, by the apparatus, communication signals received and/or to be transmitted;
 generate a control signal to select at least the first communication path dedicated, at the single digital baseband circuitry, to the first subscriber identity module card connector or to select the second communication path dedicated, at the single digital baseband circuitry, to the second subscriber identity module card connector; and
 switch, at the single digital baseband circuitry including the switch circuitry, the communication signals to the selected first communication path or the selected second communication path to enable the active and simultaneous dual talk use of the corresponding subscriber identity module associated with the selected path.

13. The apparatus of claim 12, wherein the switch circuitry couples to the first RF circuitry via an in-phase and quadrature phase interface at the single baseband processor, and wherein the switch circuitry couples to the second RF circuitry via the in-phase and quadrature phase interface.

14. The apparatus of claim 12, first subscriber identity module card connector and the second subscriber identity module card connector are defined according to a priority.

15. The apparatus of claim 12, wherein the first subscriber identity module card connector and the second subscriber identity module card connector are defined with a priority card connector and at least one secondary card connector.

16. The apparatus of claim 12, wherein the first subscriber identity module card connector and the second subscriber identity module card connector are coupled to a plurality of radio frequency integrated circuits, each of the plurality of radio frequency integrated circuits includes a programmable state machine that executes programmed instructions, wherein the programmed instructions perform write instructions to the radio frequency integrated circuits registers, thereby enabling RF control.

17. The apparatus of claim 12, wherein the first subscriber identity module card connector enables a GSM receiver chain.

18. A non-transitory computer-readable storage medium including program code which when executed by at least one processor causes operations comprising:
 detecting, by an apparatus, a state of at least a first subscriber identity module card connector and an associated first communication path and a second subscriber identity module card connector and an associated second communication path, wherein the apparatus includes a single digital baseband circuitry to enable active and simultaneous dual talk via switch circuitry configured to selectively couple the first subscriber identity module card connector and the first communication path to a first RF circuitry and to selectively couple the second subscriber identity module card connector and the second communication path to the second RF circuitry, wherein the switch circuitry comprises an in-phase and quadrature phase switch configured to enable the active and simultaneous dual talk by at least providing active paths for corresponding in-phase and quadrature phase samples to the first communication path and the second communication path;
 processing, by the apparatus, communication signals received and/or to be transmitted;
 generating a control signal to select at least the first communication path dedicated, at the single digital baseband circuitry, to the first subscriber identity module card connector or to select the second communication path dedicated, at the single digital baseband circuitry to the second subscriber identity module card connector; and
 switching, at the single digital baseband circuitry including the switch circuitry, the communication signals to the selected first communication path or the selected second communication path to enable the active and simultaneous dual talk use of the corresponding subscriber identity module associated with the selected path.

19. The method of claim 1, wherein the first subscriber identity module card connector and the second subscriber identity module card connector are configured to at least one of a GSM and a WCDMA communication protocols.

20. The method of claim 1, wherein mobile terminal detects the communication protocols according to the received or transmitted signals.

21. The method of claim 1, wherein the second communication path comprises a receiver diversity path being used as the dedicated path at the single digital baseband circuitry to the second subscriber identity module card connector.

* * * * *